(12) United States Patent
Tanaka et al.

(10) Patent No.: US 12,179,845 B2
(45) Date of Patent: Dec. 31, 2024

(54) CONNECTION MEMBER FOR VEHICLE STRUCTURE

(71) Applicants: ARISAWA MFG. CO., LTD., Joetsu (JP); TOYOTA JIDOSHA KABUSHIKI KAISHA, Toyota (JP)

(72) Inventors: Hiroshi Tanaka, Joetsu (JP); Tetsuya Kobayashi, Joetsu (JP); Takashi Yamamoto, Niigata (JP); Hiroko Suzuki, Aichi (JP)

(73) Assignees: ARISAWA MFG. CO., LTD., Joetsu (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 68 days.

(21) Appl. No.: 17/911,716

(22) PCT Filed: Mar. 12, 2021

(86) PCT No.: PCT/JP2021/010194
§ 371 (c)(1),
(2) Date: Sep. 15, 2022

(87) PCT Pub. No.: WO2021/187390
PCT Pub. Date: Sep. 23, 2021

(65) Prior Publication Data
US 2023/0174167 A1    Jun. 8, 2023

(30) Foreign Application Priority Data
Mar. 18, 2020    (JP) .................................. 2020-047385

(51) Int. Cl.
*B32B 1/08* (2006.01)
*B32B 5/06* (2006.01)
*B32B 5/22* (2006.01)
*B62D 25/20* (2006.01)
*B62D 29/04* (2006.01)
*F16C 7/02* (2006.01)

(52) U.S. Cl.
CPC .............. *B62D 29/048* (2013.01); *B32B 1/08* (2013.01); *B32B 5/06* (2013.01); *B32B 5/22* (2013.01);
(Continued)

(58) Field of Classification Search
None
See application file for complete search history.

(56) References Cited

U.S. PATENT DOCUMENTS 10,457,011 B2 *   10/2019   Stewart ..................... B32B 5/10
2014/0346811 A1   11/2014   Zaluzec et al.

FOREIGN PATENT DOCUMENTS

DE    19834772 A1 *   2/2000   ............ B29C 70/86
JP    9-111010 A       4/1997
(Continued)

OTHER PUBLICATIONS

Translation of JP2012246583 (Year: 2024).*
(Continued)

*Primary Examiner* — Alexander S Thomas
(74) *Attorney, Agent, or Firm* — Sughrue Mion, PLLC

(57) ABSTRACT

An object of the present invention is to provide an innovative and highly practical connection member for a vehicle structure. The present invention is a connection member for a vehicle structure equipped with at least two connection sections (2) that are used in the vehicle structure and that connect appropriate sites within the vehicle structure, the connection member for a vehicle structure being characterized in having a layered structure section (1) configured by impregnating a layered body (4) in which a plurality of fiber bodies (3) have been layered with a matrix resin and curing the impregnated layered body, and employing, as the fiber (Continued)

bodies (3), bodies in which bundles of unidirectionally aligned carbon fibers (5) have been interwoven with thermally fusible fibers (6).

19 Claims, 21 Drawing Sheets

(52) U.S. Cl.
CPC .......... *B62D 25/20* (2013.01); *B32B 2250/05* (2013.01); *B32B 2260/023* (2013.01); *B32B 2305/076* (2013.01); *B32B 2605/00* (2013.01); *F16C 7/026* (2013.01)

(56) References Cited

FOREIGN PATENT DOCUMENTS

| | | |
|---|---|---|
| JP | 2002-227066 A | 8/2002 |
| JP | 2005-271875 A | 10/2005 |
| JP | 2011-126075 A | 6/2011 |
| JP | 2012246583 A * | 12/2012 |
| JP | 2013-122285 A | 6/2013 |
| JP | 2015-007300 A | 1/2015 |
| JP | 2016-005955 A | 1/2016 |
| WO | 2013/031360 A1 | 3/2013 |
| WO | 2015/025573 A1 | 2/2015 |

OTHER PUBLICATIONS

Translation of DE19834772 (Year: 2024).*
Japanese Office Action for JP 2020-047385 dated May 19, 2022.
International Search Report for PCT/JP2021/010194 dated May 18, 2021.
Written Opinion for PCT/JP2021/010194 dated May 18, 2021.
International Preliminary Report on Patentability dated Sep. 20, 2022 in International Application No. PCT/JP2021/010194.

* cited by examiner

FIG.5
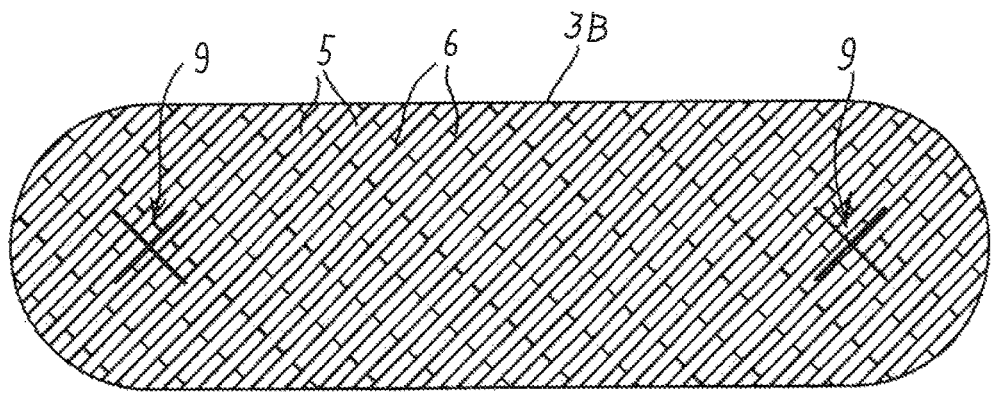
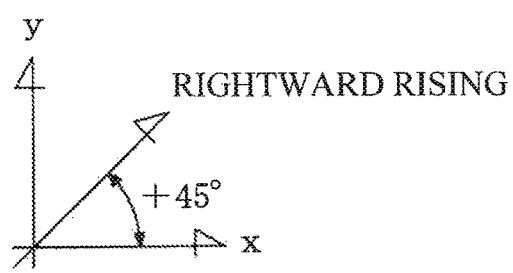
FIG.6
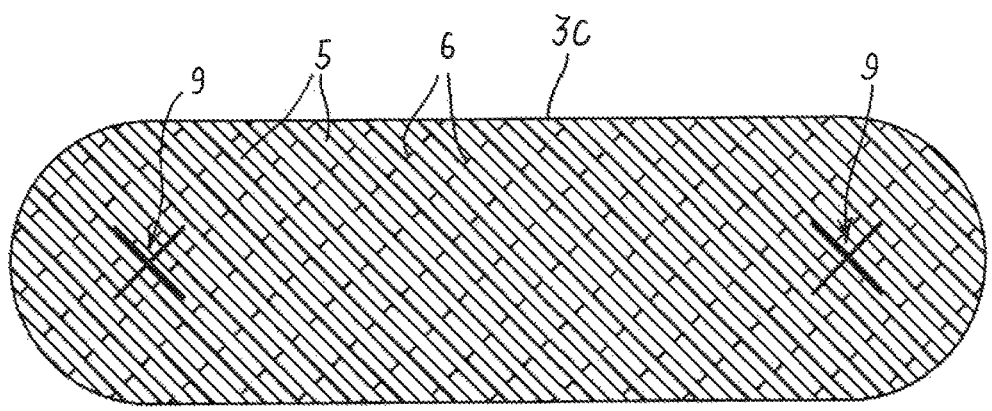
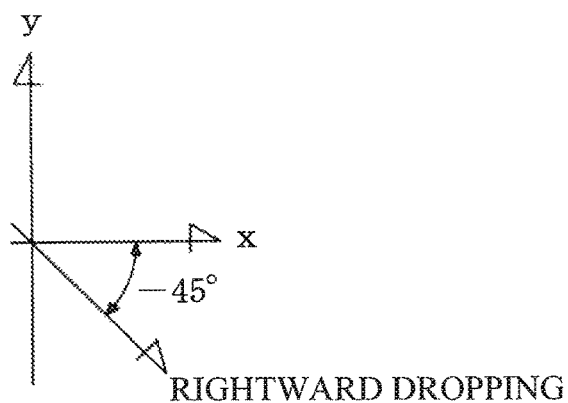

|  | PRESENT EXAMPLE (UNIDIRECTIONALLY ALIGNED FIBER-WOVEN ARTICLE) | COMPARATIVE EXAMPLE (PRIOR-ART EXAMPLE) (INTERLACED WARP THREAD /WEFT THREAD CLOTH) |
|---|---|---|
| TENSILE STRENGTH [MPa] | 882(108.8%) | 811(100.0%) |
| TENSILE ELASTICITY [GPa] | 77(116.7%) | 66(100.0%) |
| FLEXURAL STRENGTH [MPa] | 863(97.2%) | 887(100.0%) |
| FLEXURAL ELASTICITY [GPa] | 113(163.8%) | 69(100.0%) |
| TEST PIECE RESIN CONTENT [%] | 33.8 | 33.1 |

CONNECTION MEMBER FOR VEHICLE STRUCTURE

This application is a National Stage of International Application No. PCT/JP2021/010194 filed Mar. 12, 2021, claiming priority based on Japanese Patent Application No. 2020-047385 filed Mar. 18, 2020.

TECHNICAL FIELD

The present invention relates to a connection member for a vehicle structure.

BACKGROUND ART

In the past, advances in developments concerning increased power assistance and reduced fuel consumption in vehicles such as automobiles, motorcycles, etc., have been accompanied by demand for a reduction in overall vehicle weight. In this context, diverse proposals have been made in which those among the variety of components constituting such vehicles that are made of metal have been manufactured from carbon-fiber-reinforced plastics (CFRP).

In recent years, in addition to conventional approaches such as autoclave molding and press-molding, methods such as resin transfer molding (RTM), in which a fiber base material is layered in a mold in a desired format in advance before impregnation with resin, the mold is closed, and a composite material matrix resin, such as an epoxy resin, a vinyl ester resin, an unsaturated polyester resin, etc., is fed into the closed space of the mold, and vacuum-aided resin transfer molding (VARTM), in which a matrix resin is fed into the closed space while air is vacuum-suctioned out of the space, are coming to be used as methods of molding CFRP.

For three-dimensional members (thick members) that are required to have high rigidity and durability, such as automotive-vehicle members, in particular, autoclave molding in which pressure is applied to all portions of the molded article is most suitable for considerations of the quality of the CFRP (external appearance, mechanical characteristics, etc.). However, RTM molding and VARTM molding enable production output of molded articles per unit time to be increased, and attention is therefore turning to RTM molding and VARTM molding from a cost perspective.

CFRP is not an isotropic material like metal (e.g., a material that does not greatly change in physical characteristics even when pulled or bent at any angle of a flat plate), but is instead an anisotropic material (a material that, for example, has the characteristic of being tough when pulled and bent in one direction in the flat plate (the 12:00-6:00 direction) yet being extremely fragile when pulled and bent in another direction (the 3:00-9:00 direction)). In order to maximize the mechanical characteristics of CFRP, ensuring that, to the greatest extent possible, the carbon fibers do not curve, having the carbon fibers be linear and aligned in one direction (for example, in the 12:00-6:00 direction in the flat plate), and further having the carbon fiber content of the CFRP be as high as possible have merit in terms of enabling the mechanical characteristics of CFRP to be increased.

In the above-described RTM molding and VARTM molding methods, unidirectional carbon fibers that have not been impregnated with the matrix resin are cut into a desired shape conforming to a male mold or a female mold, and the carbon fibers are layered while being arranged. However, in order to prevent the carbon fibers from becoming displaced while in a layered state, it is necessary to perform operations such as layering the carbon fibers while applying a binder (serving as a glue) therebetween, using fine carbon fiber such as sewing threads to tie together bundles of the layered carbon fibers, etc., so that the carbon fibers remain in place at desired locations.

However, in RTM molding and VARTM molding, there are often situations in which, even though carbon fiber bundles were carefully made to conform with the mold after the step described above (i.e., even though the carbon fiber bundles have been shaped to the mold), bundles of unidirectionally arranged carbon fibers are subsequently displaced once the mold is closed due to the flow of injected matrix resin, disrupting the unidirectionality and producing CFRP in which desired mechanical characteristics cannot be obtained.

There are also methods that involve, e.g., gathering bundles of unidirectionally arranged carbon fibers with a binder. However, although it is possible to prevent the carbon fiber bundles from becoming displaced by applying a large amount of the binder, such methods have the disadvantage of producing molded articles that are unfit for use as CFRP in that, due to the binder adhering between carbon fibers or due to the carbon fibers being covered by the binder, in RTM molding or VARTM molding, the matrix resin fed into the mold after shaping does not sufficiently penetrate (impregnate) the carbon fibers.

Accordingly, in order to resolve the above-described problems of carbon fiber flow and impregnation, conventionally, instead of having the carbon fiber base material be a unidirectional material, RTM molding and VARTM molding methods make use of a cloth (woven material) in which warp threads and weft threads are interlaced, or of a non-crimp fabric (NCF) in which, as described in Patent Document 1, unidirectional carbon fibers are layered in the vertical direction, the horizontal direction, and in a direction inclined by 45° and sewn together by stitching threads in the pass-through direction.

Given that a cloth has interlaced warp threads and weft threads, and that NCF is sewn by stitch threads in the pass-through direction, these approaches present an advantage in that carbon fiber bundles do not become displaced when the carbon fibers are aligned with the mold or when the matrix resin is flowing.

However, in a cloth, the warp threads and the weft threads are curved at the interlaced portions thereof, for which reason a drawback is presented for which reason a drawback is presented in that the unidirectional linearity of the carbon fibers is inevitably impaired (it is well known that in CFRP, impairment to the linearity of the carbon fibers leads to desired mechanical characteristics becoming unobtainable).

In FRP, without limitation to carbon fiber, high mechanical strength (tensile, flexural, and compressive strength and elasticity) is obtainable by having fiber bundles be ordered straight and linearly. However, in NCF, unlike cloth, the warp threads and the weft threads (which may also be threads in the ±45° direction relative thereto) are not interlaced, and therefore, the carbon fibers of the warp threads and the weft threads do not curve as is the case with cloth. Nevertheless, given the structure in which stitch threads bundle and bind the carbon fibers of warp thread layers and weft thread layers, resin penetration in a resin impregnation step is made more difficult, particularly into carbon fiber bundles in the vicinity of the stitch threads, resulting in matrix-resin impregnation, which is crucial in CFRP, being inadequate (although the matrix resin is present, the carbon fibers are bound together and the matrix resin is therefore unlikely to penetrate into the carbon fibers).

Also, in NCF, as described above, the carbon fiber bundles are dense in the vicinity of the stitch threads due to the carbon fibers of the warp threads and the weft threads in the vicinity of the stitch threads being bound by the stitch threads, while the carbon fiber bundles are sparse between the stitch threads due to gaps being produced between the warp threads and the weft threads. In RTM molding and VARTM molding, once the mold is closed and the matrix resin is injected, the resin is prone to flowing into the gaps between the sparse carbon fiber bundles, and CFRP is produced in which a large amount of resin has flowed into these spaces where the carbon fibers are sparse. As a result, the resin content is greater when CFRP is molded using NCF as a fiber base material than when CFRP is molded using cloth as the fiber base material. As such, this approach has a drawback in that, due to large amounts of resin flowing into portions where the carbon fibers are sparse, it is harder to raise the fiber content and impossible to fabricate CFRP having the desired mechanical characteristics.

It should be noted that the present inventors reduced the amount of resin when using cloth to mold 2-mm-thick CFRP and were able to reduce the resin content to 20 wt % (the fiber content being 80 wt %), yet when using NCF to mold 2-mm-thick CFRP, the inventors were only able to achieve a resin content of 30 wt % (the fiber content being 70 wt %). This is because, as described above, the resin flows into gaps in the NCF where the carbon fiber bundles have become sparse, such that when NCF is used as the fiber base material, and the amount of resin is forcibly reduced, recesses, pockmarks, and other defective portions of the matrix resin will be formed on the surface layer. That is, reducing the resin content and increasing the fiber content is desirable in order to improve the mechanical characteristics of the CFRP, but, in CFRP where NCF is used as the fiber base material, the resin content is increased and the fiber content is reduced. The inventors have thus experienced a limit to the mechanical characteristics of CFRP.

There also exists, as an approach to prevent the above-described bundles of unidirectionally arranged (drawn) carbon fiber from being displaced, a method that involves using a semi-cured component (pre-preg) in which the fiber base material has been impregnated with the matrix resin. In the pre-preg, the fiber base material is impregnated with the resin in advance, and therefore, the pre-preg is not used in the above-described RTM molding and VARTM molding, mainly being used in autoclave molding and press molding.

In short, given that the matrix resin used in RTM molding and in VARTM molding is a resin formulation that that does not pass through a semi-curing step in order to improve the molding cycle per unit time (to increase the production output per unit time), typically, in RTM molding and VARTM molding, the fiber base material is shaped in a mold before resin impregnation, and the matrix resin is subsequently injected into the mold, such that no pre-preg impregnated with the resin in advance is used. However, should a pre-preg nevertheless be used in RTM molding or in VARTM molding, the compatibility of the pre-preg resin and the resin used in the RTM molding or the VARTM molding must be taken into consideration. In many cases, the matrix resin applied to a pre-preg has a long storage life and a slow curing speed, while the matrix resin used in RTM molding or in VARTM molding has a short storage life and a fast curing speed. As such, these matrix resins are unlikely to be compatible.

For example, the resin used in RTM molding or in VARTM molding cures first and forms one FRP phase, and the pre-preg resin cures later and forms another FRP phase. Two FRP phases thus occur in the same material. Given that a boundary between different material phases is produced between the two phases, and that there is insufficient compatibility (adhesion) between the two phases, a pre-preg is typically not often used in RTM molding or in VARTM molding.

Regarding this point, in autoclave molding and press molding using a pre-preg, the fiber base material is impregnated with a desired amount of resin before the molding (for example, 20-35 wt % resin content), and there is no injection of matrix resin as is the case for RTM molding and VARTM molding. The pre-preg matrix resin also works to cause fibers that have been aligned unidirectionally to adhere to each other. Therefore, even when the desired molded shape is a fan shape, provided that there is no tearing force acting from the exterior, the arcuate portion of the fan shape does not separate from the fiber bundles (such a pre-preg is termed a UD pre-preg, from the abbreviation of the term "unidirectional").

Accordingly, in autoclave molding and press molding, a carbon fiber (CF) or UD pre-preg, which has been impregnated with the matrix resin in advance, is cut into a desired shape conforming with a male mold or a female mold, and the fibers are layered while being distributed in each layer such that, for example, a first layer is positioned in the length direction and the second layer is positioned in the width direction. However, given that the matrix resin causes the fibers to adhere to each other similarly to an adhesive, the fiber bundles of the unidirectional carbon fiber material do not become displaced while in the layered state provided that no force is applied in a tearing direction during layering.

Nevertheless, in a layered and shaped CF or UD pre-preg, once the matrix resin (e.g., an epoxy resin) is heated during a step in the process of autoclave molding or press molding, the resin viscosity decreases during the curing step (e.g., in a region of less than 100° C.), and there is a risk that, due to the applied pressure and the decreased resin viscosity in the layered unidirectional CF pre-preg carbon fiber layered bodies, the matrix resin may flow in unexpected directions and the carbon fibers may lose unidirectionality by being carried along the resin flow. For example, when a CF or UD pre-preg that has been layered in the 0° direction (the 12:00-6:00 direction) is press-molded, the carbon fibers flow into a shape similar to that of a beer barrel, such that two ends situated along the length direction of the carbon fibers are positioned at the top and bottom lids of the beer barrel shape (such that the top and bottom lids of the beer barrel are at 12:00-6:00 positions).

For three-dimensional members (thick members) that are required to have high rigidity and durability, such as automotive-vehicle members, in particular, at a site where the shape changes toward the height direction (an upright section or a curved section), the carbon fibers may flow into a beer-barrel shape and the desired fiber orientation may collapse, the carbon fibers may be carried by the flow of the resin, and the flow may cause the carbon fibers to spread, positioning the fibers in undesirable directions.

There are also cases in which the resin flows out toward flow holes in the mold and the resin flows outside the fiber base material, producing resin dead spots.

In autoclave molding, which is a molding method in which it is possible to avoid defects in the fiber orientation caused by fiber flow during molding, a closed space is created within the molded article using a film (packing film) during molding, a vacuum is drawn in the closed space, and the pressure is raised, suppressing the flow of the carbon fibers resulting from the drop in viscosity of the resin. A pre-preg (UD pre-preg) composed of unidirectional element carbon fiber bundles is suited to autoclave molding, but is not an appropriate material for press molding, RTM molding, and VARTM molding.

As per the above, the development of a material (structure) that can be satisfactorily manufactured using existing molding methods, such as autoclave molding, press molding, RTM molding, VARTM molding, etc., described above, is desirable in situations in which three-dimensional members (thick members) such as automotive-vehicle members that are required to have high rigidity and durability, are manufactured from carbon fiber reinforced plastic (CFRP) configured from a material made from unidirectional carbon fiber bundles.

Patent Document 1

Japanese Unexamined Patent Application No. 2002-227066

DISCLOSURE OF THE INVENTION

Problem to be Solved by the Invention

In view of the current state described above, the present invention provides an innovative and highly practical connection member for a vehicle structure that can be satisfactorily manufactured using existing molding methods and that furthermore, in addition to being lightweight, has the high rigidity and durability, etc., required in a member provided in a vehicle structure.

Means for Solving the Problem

The key points of the present invention are described with reference to the accompanying drawings.

A connection member for a vehicle structure is equipped with at least two connection sections 2 used in the vehicle structure and that connect appropriate sites within the vehicle structure, the connection member for a vehicle structure being characterized by having a layered structure section 1 configured by impregnating a layered body 4 in which a plurality of fiber bodies 3 have been layered with a matrix resin and curing the impregnated layered body, and employing, as the fiber bodies 3, bodies in which bundles of unidirectionally aligned carbon fibers 5 have been interwoven with thermally fusible fibers 6.

Also, a connection member for a vehicle structure is equipped with at least two connection sections 2 used in the vehicle structure and that connect appropriate sites within the vehicle structure, the connection member for a vehicle structure being characterized by having a layered structure section 1 configured by impregnating a layered body 4 in which a plurality of fiber bodies 3 have been layered with a matrix resin and curing the impregnated layered body, and employing, as the fiber bodies 3, bodies in which bundles of unidirectionally aligned carbon fibers 5 have been interwoven with thermally fusible fibers 6, and the connection sections 2 being configured from metal bodies 7 affixed to the layered structure section 1.

The connection member for a vehicle structure according to the second aspect is characterized in that the metal bodies 7 are provided with a flange-form section 7b at the circumferential surface of a main body 7a, the metal bodies 7 being structures provided in a state of passing through the layered structure section 1, and the fiber bodies 3 being overlaid onto the surface of the flange-form section 7b and the circumferential surface of the main body 7a of each of the metal bodies 7 provided in the passed-through state.

The connection member for a vehicle structure according to the first aspect is characterized in that as the fiber bodies 3 there are employed: first fiber bodies 3A, in which the longitudinal direction of the carbon fiber bundles 5 is set to 0°, parallel to the longitudinal direction of the layered structure section 1; second fiber bodies 3B, in which the longitudinal direction of the carbon fiber bundles 5 is set to +45°, intersecting the longitudinal direction of the layered structure section 1; third fiber bodies 3C, in which the longitudinal direction of the carbon fiber bundles 5 is set to −45°, intersecting the longitudinal direction of the layered structure section 1; and fourth fiber bodies 3D, in which the longitudinal direction of the carbon fiber bundles 5 is set to 90°, intersecting the longitudinal direction of the layered structure section 1.

The connection member for a vehicle structure according to the second aspect is characterized in that as the fiber bodies 3 there are employed: first fiber bodies 3A, in which the longitudinal direction of the carbon fiber bundles 5 is set to 0°, parallel to the longitudinal direction of the layered structure section 1; second fiber bodies 3B, in which the longitudinal direction of the carbon fiber bundles 5 is set to +45°, intersecting the longitudinal direction of the layered structure section 1; third fiber bodies 3C, in which the longitudinal direction of the carbon fiber bundles 5 is set to −45°, intersecting the longitudinal direction of the layered structure section 1; and fourth fiber bodies 3D, in which the longitudinal direction of the carbon fiber bundles 4 is set to 90°, intersecting the longitudinal direction of the layered structure section 1.

The connection member for a vehicle structure according to the third aspect is characterized in that as the fiber bodies 3 there are employed: first fiber bodies 3A, in which the longitudinal direction of the carbon fiber bundles 5 is set to 0°, parallel to the longitudinal direction of the layered structure section 1; second fiber bodies 3B, in which the longitudinal direction of the carbon fiber bundles 5 is set to +45°, intersecting the longitudinal direction of the layered structure section 1; third fiber bodies 3C, in which the longitudinal direction of the carbon fiber bundles 5 is set to −45°, intersecting the longitudinal direction of the layered structure section 1; and fourth fiber bodies 3D, in which the longitudinal direction of the carbon fiber bundles 5 is set to 90°, intersecting the longitudinal direction of the layered structure section 1.

The connection member for a vehicle structure according to the first aspect is characterized in that the layered body 4 is attached by threads 8 passing through in the layering direction of the fiber bodies 3.

The connection member for a vehicle structure according to the second aspect is characterized in that the layered body 4 is attached by threads 8 passing through in the layering direction of the fiber bodies 3.

The connection member for a vehicle structure according to the third aspect is characterized in that the layered body 4 is attached by threads 8 passing through in the layering direction of the fiber bodies 3.

The connection member for a vehicle structure according to the fourth aspect is characterized in that the layered body 4 is attached by threads 8 passing through in the layering direction of the fiber bodies 3.

The connection member for a vehicle structure according to the fifth aspect is characterized in that the layered body 4 is attached by threads 8 passing through in the layering direction of the fiber bodies 3.

The connection member for a vehicle structure according to a sixth aspect is characterized in that the layered body 4 is attached by threads 8 passing through in the layering direction of the fiber bodies 3.

The connection member for a vehicle structure according to the fourth aspect is characterized in that the layered body 4 has a flat plate shape in which the fourth fiber bodies 3D, the third fiber bodies 3C, the second fiber bodies 3B, and the first fiber bodies 3A are layered symmetrically in the stated order in each of the upward and downward directions on either side of a thickness-direction central section.

The connection member for a vehicle structure according to the fifth aspect is characterized in that the layered body 4 has a flat plate shape in which the fourth fiber bodies 3D, the third fiber bodies 3C, the second fiber bodies 3B, and the first fiber bodies 3A are layered symmetrically in the stated order in each of the upward and downward directions on either side of a thickness-direction central section.

The connection member for a vehicle structure according to the sixth aspect is characterized in that the layered body 4 has a flat plate shape in which the fourth fiber bodies 3D, the third fiber bodies 3C, the second fiber bodies 3B, and the first fiber bodies 3A are layered symmetrically in the stated order in each of the upward and downward directions on either side of a thickness-direction central section.

The connection member for a vehicle structure according to the fourth aspect is characterized in that the layered body 4 has a flat plate shape in which the fourth fiber bodies 3D, the second fiber bodies 3B, the third fiber bodies 3C, and the first fiber bodies 3A are layered symmetrically in the stated order in each of the upward and downward directions on either side of a thickness-direction central section.

The connection member for a vehicle structure according to the fifth aspect is characterized in that the layered body has a flat plate shape in which the fourth fiber bodies 3D, the second fiber bodies 3B, the third fiber bodies 3C, and the first fiber bodies 3A are layered symmetrically in the stated order in each of the upward and downward directions on either side of a thickness-direction central section.

The connection member for a vehicle structure according to the sixth aspect is characterized in that the layered body 4 has a flat plate shape in which the fourth fiber bodies 3D, the second fiber bodies 3B, the third fiber bodies 3C, and the first fiber bodies 3A are layered symmetrically in the stated order in each of the upward and downward directions on either side of a thickness-direction central section.

The connection member for a vehicle structure according to the fourth aspect is characterized in that the layered body 4 has a rod-form shape and including: a first layer section 4A provided by winding the first fiber bodies 3A; a second layer section 4B, provided by winding the second fiber bodies 3B and the third fiber bodies 3C in an overlaid state about the first layer section 4A; a third layer section 4C, provided by winding the fourth fiber bodies 3D about the second layer section 4B; a fourth layer section 4D, provided by winding the second fiber bodies 3B and the third fiber bodies 3C in an overlaid state about the third layer section 4C; and a fifth layer section 4E, provided by winding the first fiber bodies 3A about the fourth layer section 4D.

The connection member for a vehicle structure according to the fifth aspect is characterized in that the layered body 4 has a rod-form shape and including: a first layer section 4A provided by winding the first fiber bodies 3A; a second layer section 4B, provided by winding the second fiber bodies 3B and the third fiber bodies 3C in an overlaid state about the first layer section 4A; a third layer section 4C, provided by winding the fourth fiber bodies 3D about the second layer section 4B; a fourth layer section 4D, provided by winding the second fiber bodies 3B and the third fiber bodies 3C in an overlaid state about the third layer section 4C; and a fifth layer section 4E, provided by winding the first fiber bodies 3A about the fourth layer section 4D.

The connection member for a vehicle structure according to the sixth aspect is characterized in that the layered body 4 has a rod-form shape and including: a first layer section 4A provided by winding the first fiber bodies 3A; a second layer section 4B, provided by winding the second fiber bodies 3B and the third fiber bodies 3C in an overlaid state about the first layer section 4A; a third layer section 4C, provided by winding the fourth fiber bodies 3D about the second layer section 4B; a fourth layer section 4D, provided by winding the second fiber bodies 3B and the third fiber bodies 3C in an overlaid state about the third layer section 4C; and a fifth layer section 4E, provided by winding the first fiber bodies 3A about the fourth layer section 4D.

The connection member for a vehicle structure according to the nineteenth aspect is characterized in that: the first fiber bodies 3A configuring the first layer section 4A, and the second fiber bodies 3B and the third fiber bodies 3C in the overlaid state configuring the second layer section 4B, are set so as to be wound in opposite directions; the second fiber bodies 3B and the third fiber bodies 3C in the overlaid state configuring the second layer section 4B, and the fourth fiber bodies 3D configuring the third layer section 4C, are set so as to be wound in opposite directions; the fourth fiber bodies 3D configuring the third layer section 4C, and the second fiber bodies 3B and the third fiber bodies 3C in the overlaid state configuring the fourth layer section 4D, are set so as to be wound in opposite directions; and the second fiber bodies 3B and the third fiber bodies 3C in the overlaid state configuring the fourth layer section 4D, and the first fiber bodies 3A configuring the fifth layer section 4E, are set so as to be wound in opposite directions.

The connection member for a vehicle structure according to the twentieth aspect is characterized in that: the first fiber bodies 3A configuring the first layer section 4A, and the second fiber bodies 3B and the third fiber bodies 3C in the overlaid state configuring the second layer section 4B, are set so as to be wound in opposite directions; the second fiber bodies 3B and the third fiber bodies 3C in the overlaid state configuring the second layer section 4B, and the fourth fiber bodies 3D configuring the third layer section 4C, are set so as to be wound in opposite directions; the fourth fiber bodies 3D configuring the third layer section 4C, and the second fiber bodies 3B and the third fiber bodies 3C in the overlaid state configuring the fourth layer section 4D, are set so as to be wound in opposite directions; and the second fiber bodies 3B and the third fiber bodies 3C in the overlaid state configuring the fourth layer section 4D, and the first fiber bodies 3A configuring the fifth layer section 4E, are set so as to be wound in opposite directions.

The connection member for a vehicle structure according to the twenty-first aspect is characterized in that: the first fiber bodies 3A configuring the first layer section 4A, and the second fiber bodies 3B and the third fiber bodies 3C in the overlaid state configuring the second layer section 4B, are set so as to be wound in opposite directions; the second fiber bodies 3B and the third fiber bodies 3C in the overlaid state configuring the second layer section 4B, and the fourth fiber bodies 3D configuring the third layer section 4C, are set so as to be wound in opposite directions; the fourth fiber bodies 3D configuring the third layer section 4C, and the second fiber bodies 3B and the third fiber bodies 3C in the overlaid state configuring the fourth layer section 4D, are set so as to be wound in opposite directions; and the second fiber bodies 3B and the third fiber bodies 3C in the overlaid state configuring the fourth layer section 4D, and the first fiber bodies 3A configuring the fifth layer section 4E, are set so as to be wound in opposite directions.

The connection member for a vehicle structure according to any one of the first through twenty-fourth aspects is characterized by being a link rod, a tower bar, or an under cover.

Effects of the Invention

Being configured as described above, the present invention is an innovative and highly practical connection member for a vehicle structure, that can be satisfactorily manufactured using existing molding methods and that furthermore, in addition to being lightweight, has the high rigidity and durability, etc., required in a member provided in a vehicle structure.

BRIEF DESCRIPTION OF THE DRAWINGS

FIG. 5 is a plan view of the key sections of example 1;
FIG. 6 is a plan view of the key sections of example 1;
FIG. 3 is a diagram for illustrating the process of manufacturing example 1.

BEST MODE FOR CARRYING OUT THE INVENTION

Figure 1:
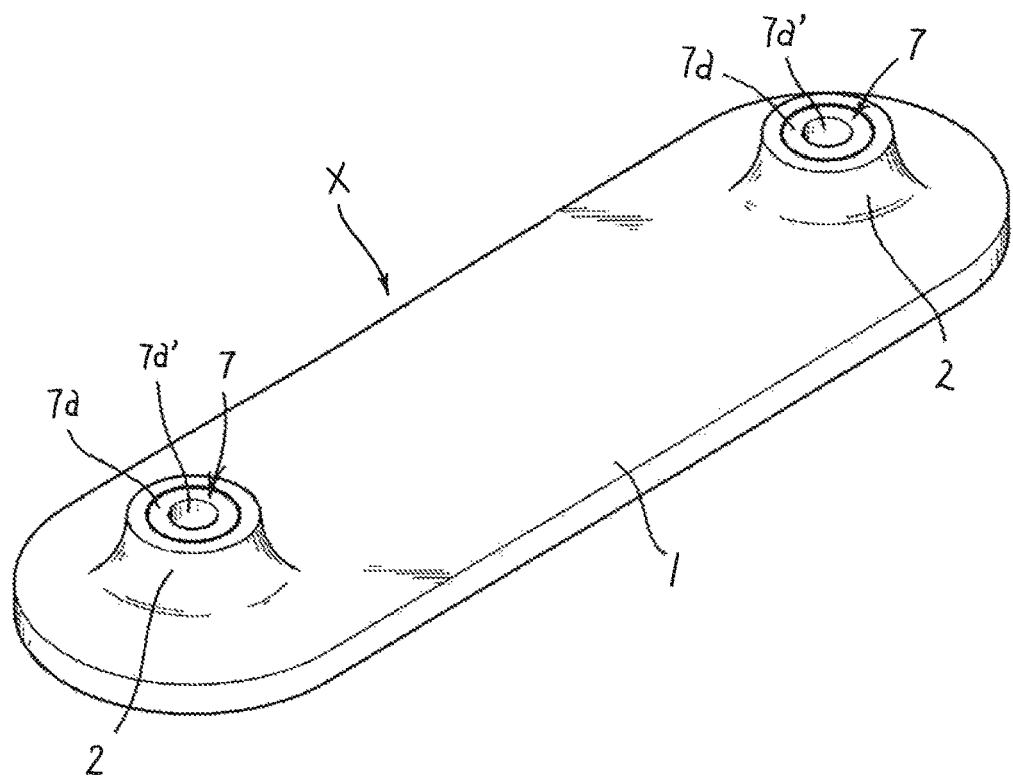
FIG. 1 is a perspective view of example 1.

A preferred embodiment of the present invention is briefly described below with reference to the drawings while indicating the effects of the present invention.

The present invention is connected to appropriate portions 51, 52 in a vehicle structure with connection sections 2 interposed therebetween, and assumes a state of being suspended between the portions 51 and 52.

When, for example, a load has been applied to at least one of the appropriate portions 51, 52 in the vehicle structure while the vehicle is traveling, the present invention satisfactorily responds to the forces (forces produced by pulling, bending, and twisting) produced between the appropriate portions 51, 52 in the vehicle structure.

It should be noted that the present invention has a layered structure section 1 configured by causing a layered body 4 in which a plurality of fiber bodies 3 have been layered to be impregnated with a matrix resin, and curing the resulting article, and bodies in which carbon fiber bundles 5 that have been aligned unidirectionally have been interwoven with thermally fusible fibers 6 are employed as the fiber bodies 3, the carbon fiber bundles 5 being fixed in place (heat set) in a state of being interwoven with the thermally fusible fibers 6 once the fusible material in the thermally fusible fibers 6 is fused by applying heat to the fiber bodies 3.

In other words, the carbon fiber bundles 5 are secured in advance. In subsequent processing, for example, various manufacturing steps such as cutting the fiber bodies 3, impregnating the layered body 4 in which the fiber bodies 3 have been layered with the matrix resin, molding using the above-described autoclave molding, press molding, RTM molding, or VARTM molding methods, etc., the material neither loses shape nor collapses.

Accordingly, manufacturing can be performed satisfactorily using an existing molding method, and a structure may consequently be obtained as designed. Therefore, a structure that is suited to a connection member for a vehicle structure; i.e., a structure that is lightweight as well as having the high rigidity and durability required in a member provided in a vehicle structure will reliably be obtained.

EXAMPLES

Specific examples of the present invention are described below with reference to the drawings.

The present examples are of a connection member X for a vehicle structure equipped with at least two connection sections 2 used in the vehicle structure and that connect appropriate sites within the vehicle structure, the connection member for a vehicle structure having a layered structure section 1 (carbon fiber composite material: CFRP) configured by impregnating a layered body 4 in which a plurality of fiber bodies 3 have been layered with a matrix resin and curing, employing, as the fiber bodies 3, bodies in which bundles of unidirectionally aligned carbon fibers 5 have been interwoven with thermally fusible fibers 6, and the connection sections 2 being configured from metal bodies 7 affixed to the layered structure section 1.

Figure 3:
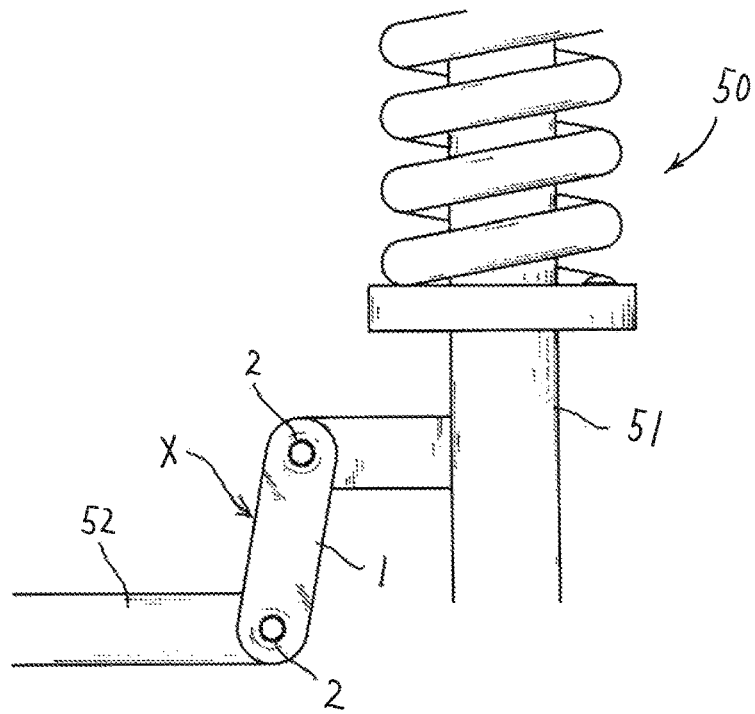
FIG. 3 is an explanatory diagram of example 1 in a state of use.

In the present examples, a link rod that couples a suspension 51 and a stabilizer 52 of a vehicle 50, as indicated in FIG. 3, is employed as the connection member X used in the vehicle structure. However, a tower bar (a rod-form body suspended between left and right vehicle attachment sections of the suspension 51), an under cover (a plate-form body suspended on the bottom section of the vehicle body), etc., are also widely applicable as the connection member X for a vehicle structure suspended between parts of a vehicle 50 such as an automobile, a motorcycle, etc., and subjected to a load.

In the present examples, unidirectional fiber bodies (carbon fiber pre-preg, hereinafter termed "CF pre-preg"), configured by interweaving carbon fiber bundles 5 and thermally fusible fibers 6 as warp threads and weft threads, are employed as the fiber bodies 3 that constitute the layered body 4.

Figure 4:
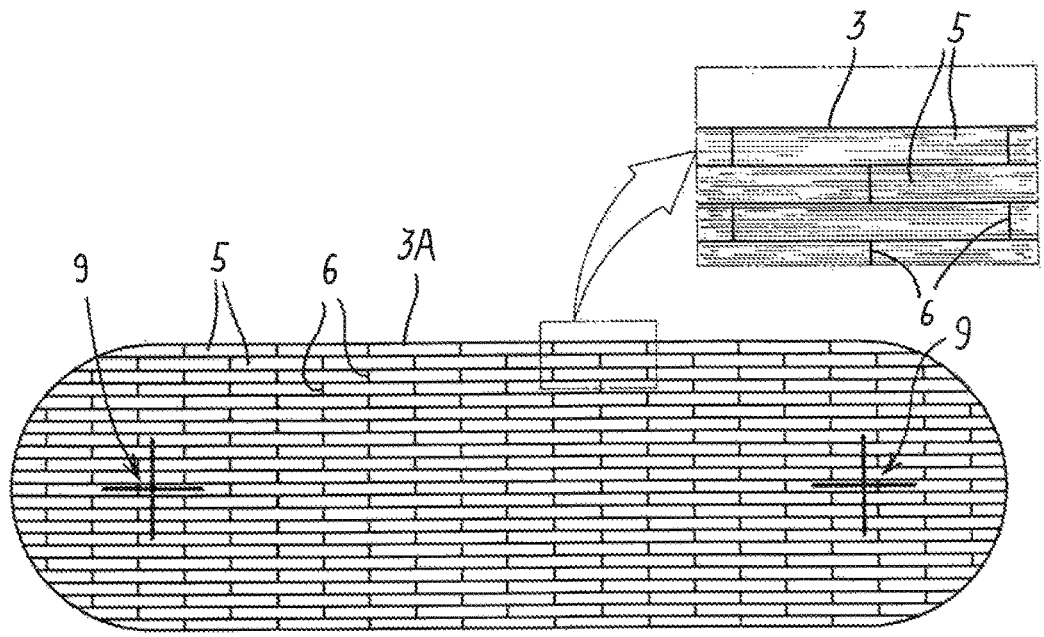
FIG. 4 is a plan view of the key sections of example 1.

In the carbon fiber bundles 5 that constitute the fiber bodies 3 (CF pre-preg), a plurality of the carbon fibers are gathered without being twisted (see FIG. 4).

Specifically, carbon fibers manufactured by Toray Industries, Inc., (TORAYCA T800HB 6K (223 tex, "tex" being the number of grams per thousand meters, and "223 tex" indicating that the fibers have a weight of 223 g/1000 m) are employed as the carbon fibers, a plurality of the carbon fibers being gathered without being twisted. The carbon fiber bundles 5 may also be configured by twisting and gathering the carbon fibers, similarly to the weft threads (described later). However, linearity is impaired because doing so causes each individual fiber to assume the form of a spiral. It is desirable not to twist the carbon fibers in order to facilitate resin impregnation.

In the thermally fusible fibers 6 configuring the fiber bodies 3 (CF pre-preg), glass fibers and thermally fusible nylon fibers are twisted and gathered, the thermally fusible fibers 6 being of smaller diameter than the above-described carbon fiber bundles 5.

Specifically, glass fibers (ECG 225 1/0 (22.5 tex)) are employed as the glass fibers, and thermally fusible nylon fibers manufactured by Toray Industries, Inc., (Elder 110 dtex (11 tex)) or thermally fusible nylon fibers manufactured by Unitika Ltd., (FLOR-M 330T36, 110 dtex (11 tex)) are employed as the thermally fusible nylon fibers. The glass fibers and the thermally fusible nylon fibers are Z-twist (left-handed twist), 120-T/m yarn ("T/m" indicates twists per meter; "120 T/m" signifies that the yarn is twisted 120 times per meter).

In the present examples, when providing the unidirectional fiber bodies 3 using the above-described warp threads (carbon fiber bundles 5) and weft threads (thermally fusible fibers 6), the weaving density is 35 warp threads per 25 mm and 3.0 weft threads per 25 mm. Only the warp threads, which have a basis weight of 312 g/m$^2$, are formed from the carbon fibers. The weft threads are formed from E-glass fibers and from thermally fusible fibers. A cloth having a 1000-1080 mm width and a 100 m length is woven using a 41-inch rapier loom. A 41-inch rapier loom is not provided by way of limitation to the loom; a 50-inch rapier loom or an air-jet loom may also be used.

Instead of the above-described Torayca T800HB 6K (223 tex) fibers, the warp threads may also be Torayca T700SC 12K (1650 tex) threads having a weaving density of 5.6 threads per 25 mm and a basis weight of 600 g/m$^2$.

Also, when high strength is required in the layered structure section 1 (CFRP), the warp threads may be MR70 12P (415 tex) fibers manufactured by Mitsubishi Chemical Corporation at a weaving density of 18.0 threads per 25 mm and having a basis weight of 300 g/m$^2$.

Conversely, when high elasticity (rigidity) is required in the layered structure section 1 (CFRP), the warp threads may be XN-60-60S (890 Tex) fibers manufactured by Nippon Graphite Fiber Co., Ltd., at a weaving density of 8.5 threads per 25 mm and a basis weight of 300 g/m$^2$.

The type of carbon fiber in the warp threads is selected, as appropriate, in accordance with the character (e.g., high strength or high elasticity) of the layered structure section 1 (CFRP), and the weaving density of the warp threads is designed such that the basis weight thereof is from 100 to 800 g/m$^2$. A basis weight of 100 g/m$^2$ or less and a basis weight of 800 g/m$^2$ or more are theoretically possible. However, at a basis weight of 100 g/m$^2$ or less, it is necessary to overlay a large number of layers in the subsequent fiber body 3 (CF pre-preg) layering step in order to reach a desired thickness.

Conversely, at a basis weight of 800 g/m$^2$ or greater, there is a risk of insufficient resin penetration in a resin coating step for producing the pre-preg, and the coating speed must be reduced (slowed down). Both of these situations require additional steps. Although such approaches are plausible from a technical perspective, a design such that the basis weight is from 100 to 800 g/m$^2$ is desirable from a cost perspective.

E-glass fibers and thermally fusible nylon fibers are used in the weft threads, the weaving density thereof being designed, as appropriate, so as to be from 1 to 5 threads per 25 mm.

When the number of warp threads is greater, a cloth having a greater basis weight is obtained. When the weft thread weaving density is one thread per 25 mm, then when the CF pre-preg is cut into a fan shape as described below and the chord length thereof is no more than 25 mm, the carbon fibers become displaced after being cut into the fan shape. The weaving density of the weft threads is therefore designed in accordance with the fan shape that is cut.

When the weaving density of the weft threads is greater than 5 threads per 25 mm, the carbon fibers do not become displaced even when the fiber bodies 3 (CF pre-preg) are cut into a fan shape. However, the number of curve points in the warp threads and the weft threads is increased. It is therefore preferable to have the upper limit of the weaving density of the weft threads be 5 threads per 25 mm (on the order of having one weft thread at 5 mm intervals in the length direction of the warp threads).

As described above, carbon fiber bundles 5 and thermally fusible fibers 6 are interwoven as the warp threads and the weft threads. The cloth is thermocompression-bonded continuously for 3-5 minutes using a 150-170° C. hot roller, so as to fuse the low-melting-point nylon looped into the thermally fusible nylon threads (Elder 110 dtex fibers).

In the carbon fiber base material thereby obtained, the warp threads are fixed in place (heat set) by the low-melting-point nylon, and will not be deformed even if the cloth is torn in the direction orthogonal to the warp threads. In other words, if the cloth is torn in the direction orthogonal to the warp threads without the low-melting-point nylon fibers having been fused, the warp threads will deform and gaps will form therebetween. Heat setting enables the fan shape to be maintained without fraying of the warp threads even when, for example, the cloth is cut into a fan shape. With ordinary cloth that has not been heat set as with the present example, or with a carbon fiber base material in which the carbon fibers have only been bundled unidirectionally is used, then the woven fibers will fray when, for example, the cloth is cut in a fan shape. In a base material in which the carbon fibers have been bundled unidirectionally, it is not possible for the shape to be maintained and the fibers will be displaced.

An advantage is presented in the present example in that glass fibers and thermally fusible nylon fibers are used as the weft threads, whereby any glass fibers remaining after thermal fusion have good compatibility with the epoxy resin applied in the pre-preg manufacturing step (the glass fibers and epoxy resin adhere to each other because water is not repelled as with a waterproof sprayed cloth). Carbon fibers and thermally fusible nylon fibers may also be used in the weft threads. However, even the thinnest carbon fibers, namely the carbon fibers manufactured by Toray Industries, Inc. (Torayca 300 1K) are 66 tex fibers, and as such have approximately three times the thickness of the glass fibers used in the present example (ECG225 1/0 (22.5 tex)). Employing a higher weaving density for the weft threads, such as 5 threads per 25 mm, impairs the linearity of the warp threads. Therefore, when carbon fibers are applied as the weft threads, the weft threads must be woven in a sparse distribution, such as 1 thread per 25 mm.

The carbon fiber base material obtained as described above is impregnated with a 250° F. (120-130° C.)- or 350° F. (160-180° C.)-curing epoxy resin via a solvent method (a method in which the resin is dissolved in an organic solvent to produce a varnish) or a non-solvent method (a hot-melting method), and heated. The coating conditions of the epoxy resin impregnation are adjusted so as to yield a suitable semi-cured state (e.g., a level of tack at which the resin will not adhere to the hand when touched directly), and a fiber body 3 in a suitable semi-cured state (CF pre-preg) is obtained.

Typically, when an epoxy resin is applied during a pre-preg manufacturing step, a horizontal device (a coating device in which temperature zones extend in the horizontal direction) is used for non-solvent approaches, and a vertical device (a coating device in which temperature zones extend vertically) is used for solvent approaches.

Aligning base materials only having unidirectional fibers (i.e., that are devoid of weft threads) and applying the resin in a vertical device presents a drawback in that the epoxy resin with which the fibers have been impregnated will flow downward in the vertical temperature zones, such that appropriate resin content control is not possible.

In a cloth having a structure that is not heat-set, even when using a carbon fiber base material that has a weaving density of 3.0 weft threads per 25 mm, similarly to the present example, there is a drawback in that the resin flows downward in the vertical temperature zones, deformation occurs due to the weft threads being pushed downward, and the warp and weft threads of the cloth lose their orthogonality. For a unidirectional-fiber base material, a horizontal coating device is typically used for both non-solvent methods and solvent methods.

However, in the carbon fiber cloth of the present examples, the warp threads and the weft threads are heat set and therefore, the weft threads do not flow regardless of whether a vertical coating device or a horizontal coating device is used. The warp threads and the weft threads are identical fibers, and the desired resin content may be controlled in a manner similar to a carbon fiber cloth having roughly the same weaving density.

Figures 33, 34:
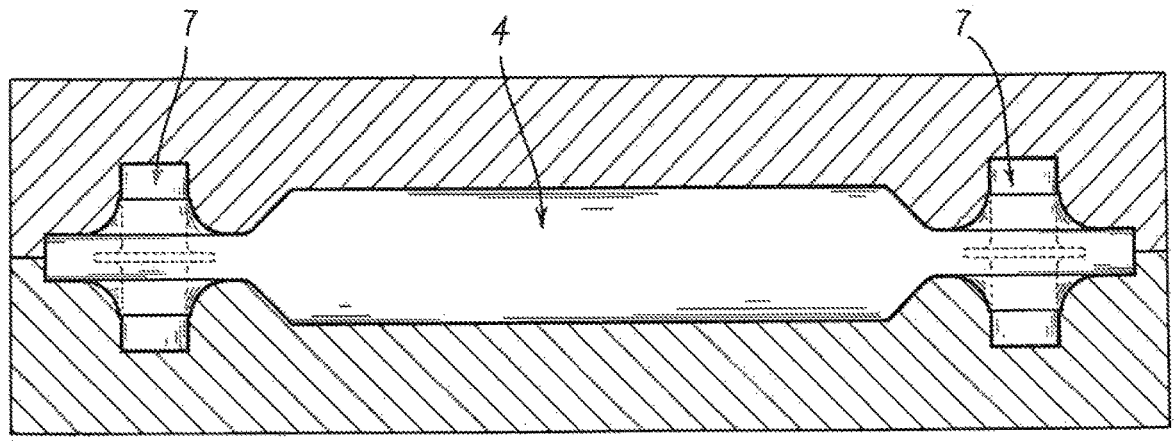
FIG. 33 is an explanatory diagram of the manufacturing process of example 2.
FIG. 34 is a table indicating comparative test results.

In FIG. 34 a comparison is made between the tensile characteristics and the flexural characteristics of a CFRP composed of alternating layers of two types of unidirectional fiber bodies (0°-direction elements and 90°-direction elements) of carbon fibers (Torayca T800HB 6K carbon fibers manufactured by Toray Industries, Inc.), representing the present examples, and a CFRP composed of layers of cloth in which warp threads and weft threads obtained from the same carbon fibers are interlaced (warp threads in the 0° direction, weft threads in the 90° direction).

Although there are no great differences in both tensile and flexural strength, in the present examples, there is no interlacing of fibers in the 0° direction and the 90° direction, and little curving of the fibers. An effect is accordingly exhibited in that the tensile elasticity is improved by at least 15% in comparison to the prior-art example, and the flexural elasticity is improved by at least 50% over the prior-art example.

Specific examples are described below.

Example 1

A method for manufacturing a link rod X that has a rectangular (square) cross-section used in a vehicle structure is described below.

As indicated in FIG. 1, the link rod X has a race track shape with two holes, having a 280 mm total length and an 80 mm width, and has a hybrid structure in which a layered structure section 1 (CFRP) is provided with connection sections 2 formed from metal bodies 7 at the left and right end sections thereof (described later).

Figure 2:
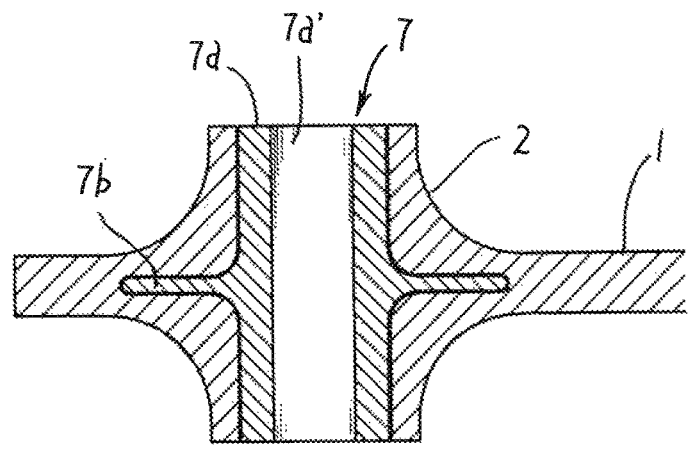
FIG. 2 is a cross-sectional view of key sections of example 1.

As indicated in FIGS. 1 and 2, the metal bodies 7 are each configured from an appropriate metal member (7075 duralumin), each having a columnar main body 7a that has a 20-mm diameter and a 42-mm length, and a flange-form section 7b that is machined into the circumferential-surface central section of the main body 7a so as to have a 2 mm thickness and a 40-mm diameter.

The metal bodies 7 are each provided with a 11-mm-diameter hole 7a' during finishing processing, the distance between the hole centers thereof being set to 200 mm.

The flange-form sections 7b will be sandwiched between layers of the fiber bodies 3 (CF pre-preg), which are layered as described below. As such, the outer circumference of each of the flange-form sections 7b is rounded off rather than being squared off, in order to avoid stress concentration when forces are applied to the link rod X. The rounded shape serves as an overlaid layer and therefore contributes to improving the force of adhesion between the metal bodies 7 and the fiber bodies 3 (CF pre-preg).

A square sheet of CF pre-preg (not shown) provided as described above is cut into a race track shape having a 280 mm total length and an 80 mm width, being specifically formed into the four types of fiber bodies 3 (first fiber bodies 3A, second fiber bodies 3B, third fiber bodies 3C, fourth fiber bodies 3D (described later)).

The CF pre-preg cutting step may involve either manual cutting using a cutting tool such as a cutter, scissors, etc., or may be performed using a laser cutter, a pre-preg cutter machine, etc.

As depicted in FIG. 4, the first fiber bodies 3A are configured such that the longitudinal direction of the carbon fiber bundles 5 is set to 0°, parallel to the longitudinal direction of the layered structure section 1 (pieces in which the CF pre-preg is cut such that the longitudinal direction of the carbon fiber bundles 5 is parallel to the longitudinal direction of the layered structure section 1: 0°-direction elements).

As depicted in FIG. 5, the second fiber bodies 3B are configured such that the longitudinal direction of the carbon fiber bundles 5 is set to +45°, intersecting the longitudinal direction of the layered structure section 1 (pieces in which the CF pre-preg is cut such that the longitudinal direction of the carbon fiber bundles 5 rises rightward at 45° relative to the longitudinal direction of the layered structure section 1: +45°-direction elements). In FIG. 5, the x-axis is the longitudinal direction of the layered structure section 1 and the y-axis is the direction perpendicular to the longitudinal direction of the layered structure section 1.

As depicted in FIG. 6, the third fiber bodies 3C are configured such that the longitudinal direction of the carbon fiber bundles 5 is set to −45°, intersecting the longitudinal direction of the layered structure section 1 (pieces in which the CF pre-preg is cut such that the longitudinal direction of the carbon fiber bundles 5 drops rightward at 45° relative to the longitudinal direction of the layered structure section 1: −45°-direction elements). In FIG. 6, the x-axis is the longitudinal direction of the layered structure section 1 and the y-axis is the direction perpendicular to the longitudinal direction of the layered structure section 1.

Figure 7:
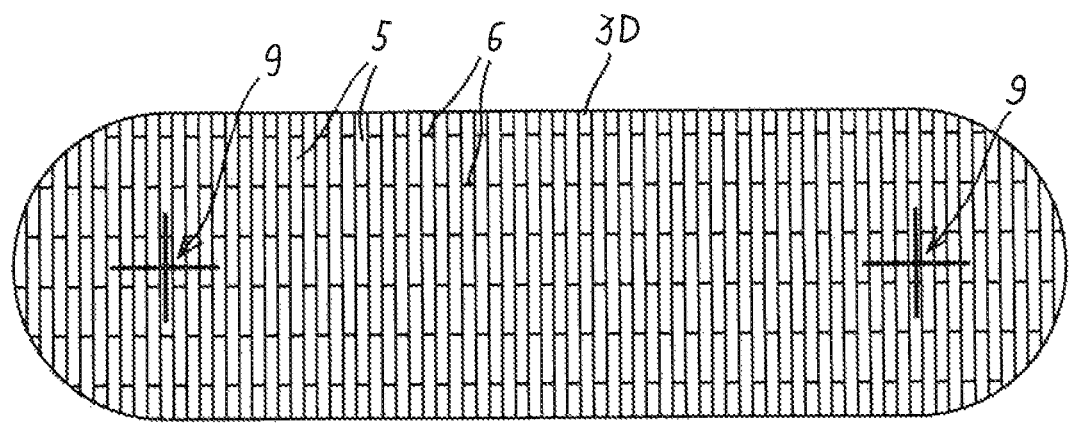
FIG. 7 is a plan view of the key sections of example 1.

As depicted in FIG. 7, the fourth fiber bodies 3D are configured such that the longitudinal direction of the carbon fiber bundles 5 is set to 90°, intersecting the longitudinal direction of the layered structure section 1 (pieces in which the CF pre-preg is cut such that the longitudinal direction of the carbon fiber bundles 5 is perpendicular to the longitudinal direction of the layered structure section 1: 90°-direction elements).

Slits 9 are provided in each of the first fiber bodies 3A, the second fiber bodies 3B, the third fiber bodies 3C, and the fourth fiber bodies 3D for the metal bodies 7 to pass through (at central sections 200 mm apart, located 40 mm from both end sections).

Specifically, as depicted in FIGS. 4 and 7, 25-30 mm cross-shaped slits 9 are formed in the first fiber bodies 3A and in the fourth fiber bodies 3D in the 0° and 90° directions, and, as depicted in FIGS. 5 and 6, 25-30 mm cross-shaped slits 9 are formed in the second fiber bodies 3B and the third fiber bodies 3C in the *45° and −45° directions, the slits 9 being formed at two locations on the left and right.

Having the cross-shaped slits 9 be formed in the +45° and −45° directions in the first fiber bodies 3A and the fourth fiber bodies 3D, or conversely, having the cross-shaped slits 9 be formed in the 0° and 90° directions in the second fiber bodies 3B and the third fiber bodies 3C, leads to the fibers in triangular portions where the crosses intersect being cut, and to the carbon fibers being cut at vertically overlaid portions of the metal bodies 7, which is not desirable for considerations of retaining adhesive force, retaining strength, and retaining rigidity.

Next, the first fiber bodies 3A, the second fiber bodies 3B, the third fiber bodies 3C, and the fourth fiber bodies 3D, obtained as described above, are layered (lay-up layering).

Figure 8:
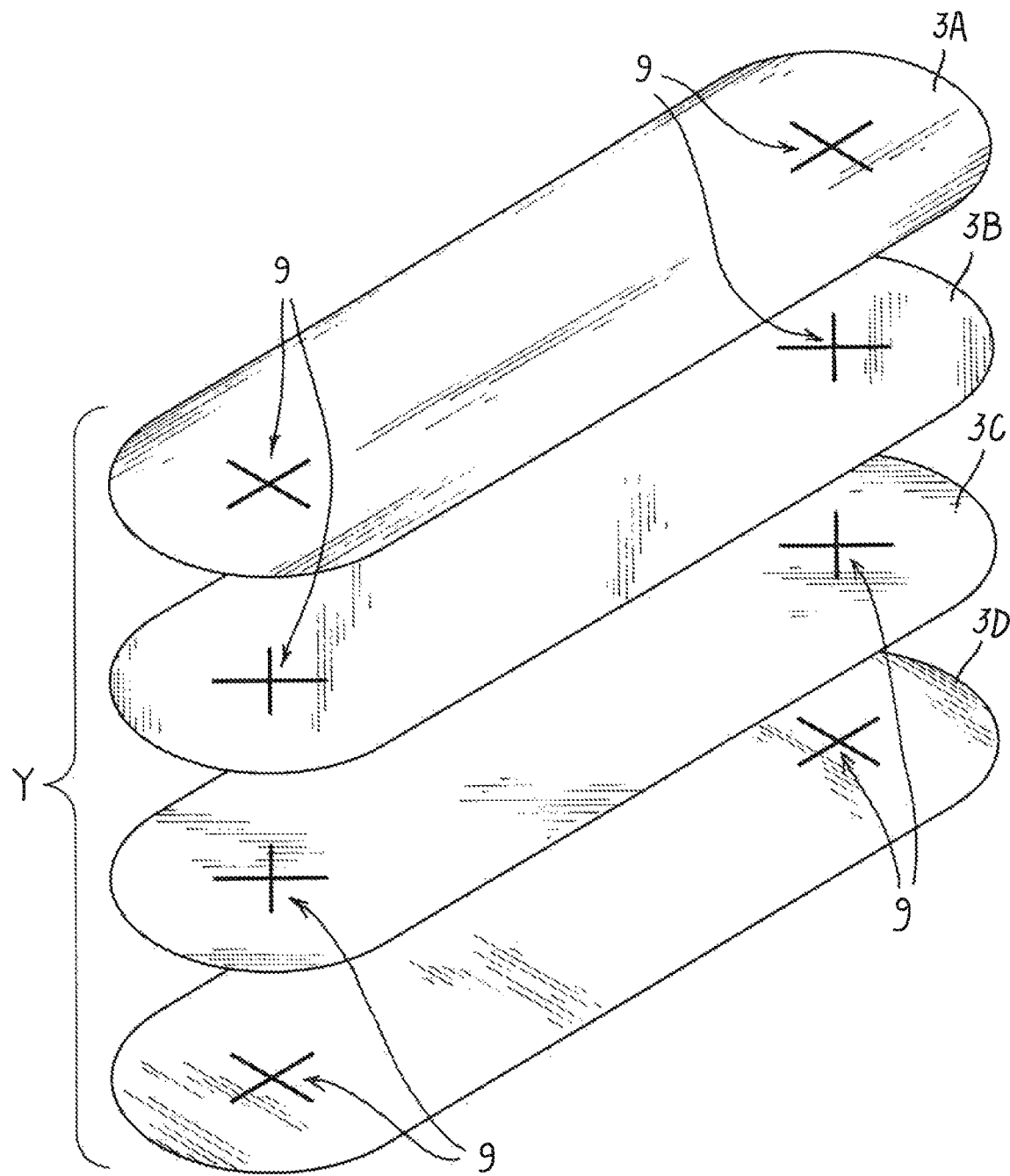

Specifically, as depicted in FIG. 8, the first fiber bodies 3A, the second fiber bodies 3B, the third fiber bodies 3C, and the fourth fiber bodies 3D are taken as a single group of four layers (unit layered element Y), the fourth fiber bodies 3D (90°-direction elements), the third fiber bodies 3C (−45°-direction elements), the second fiber bodies 3B (+45°-direction elements), and the first fiber bodies 3A (0°-direction elements) being layered in the stated order from the bottom. The order in which the second fiber bodies 3B and the third fiber bodies 3C are layered may be reversed. However, layering is performed such that the flange-form sections 7b of the metal bodies 7 serve as the axis of symmetry in the middle.

In the present example, eight of the unit layered elements Y are provided, and the layered body 4 is provided by layering the eight unit layered elements Y. When the unit layered elements Y are layered to form the layered body 4, the metal bodies 7 are provided at the left and right portions thereof.

Figure 9:
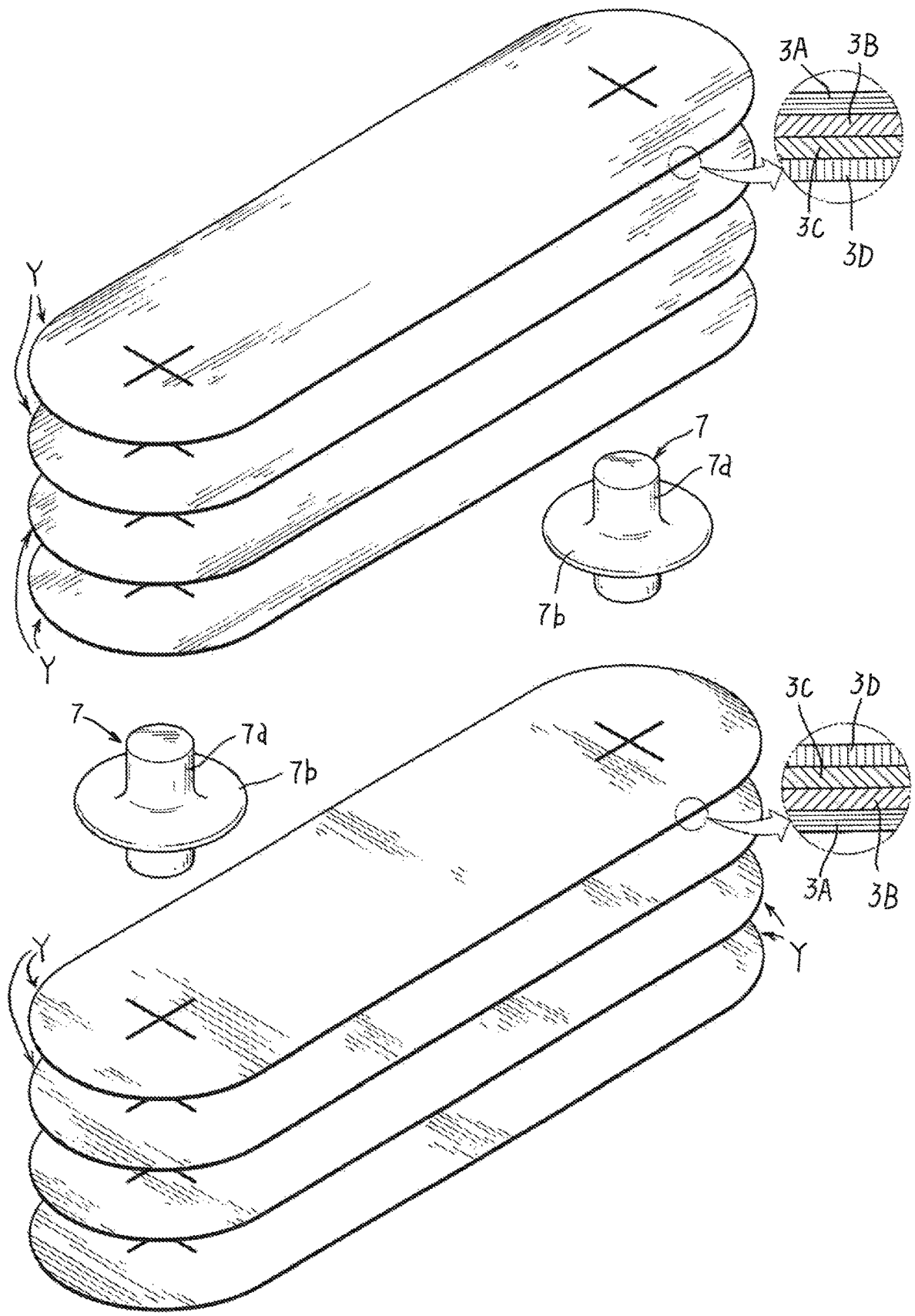
FIG. 9 is a diagram for illustrating the process of manufacturing example 1.

Specifically, as depicted in FIG. 9, the layering involves having a portion of the metal body 7 above the flange-form section 7b pass through and press against the slits 9 of the four unit layered elements Y for which the first fiber bodies 3A (0°-direction elements) serving as the outermost layer of the unit layered elements Y are upward-facing, and having a portion of the metal body 7 that is below the flange-form section 7b pass through and press against the slits 9 of the four unit layered elements Y for which the first fiber bodies 3A (0°-direction elements) serving as the outermost layer of the unit layered elements Y are downward-facing. When this action is performed, the portions of the fiber bodies 3 peripheral to the slits 9 are in an overlaid state at the surface of the flange-form section 7b and the circumferential surface of the main body 7a of each the metal bodies 7. Portions of the fiber bodies 3 in the overlaid state that protrude beyond the upper and lower surfaces of the metal bodies 7 are cleanly cut such so as to be flush with the upper and lower surfaces.

Through the layering, the layered body 4 assumes the shape of a flat plate in which the fourth fiber bodies 3D, the third fiber bodies 3C, the second fiber bodies 3B, and the first fiber bodies 3A are layered symmetrically in the stated order in each of the upward and downward directions on either side of a thickness-direction center section where the flange-form sections 7b of the metal bodies 7 are located. Four sets of the unit layered elements Y are layered in each of the upward and downward directions on either side of the flange-form sections 7b of the metal bodies 7, forming a layered structure body Y' composed of a total of 32 layers of the fiber bodies 3.

The number of the unit layered elements Y is discretionary. However, the number of layers on each of the upward side and the downward side of the flange-form sections 7b of the metal bodies 7 is preferably the same.

In the present example, in addition to the first fiber bodies 3A, the second fiber bodies 3B, the third fiber bodies 3C, and the fourth fiber bodies 3D described above, fifth fiber bodies 3E and sixth fiber bodies 3F serving as cover elements covering the layered structure body Y' are provided.

Specifically, a square CF pre-preg is cut into rectangles having a 170 mm width and a 290 mm length, forming two types of fiber bodies 3 (the fifth fiber bodies 3E and the sixth fiber bodies 3F).

Figure 10:
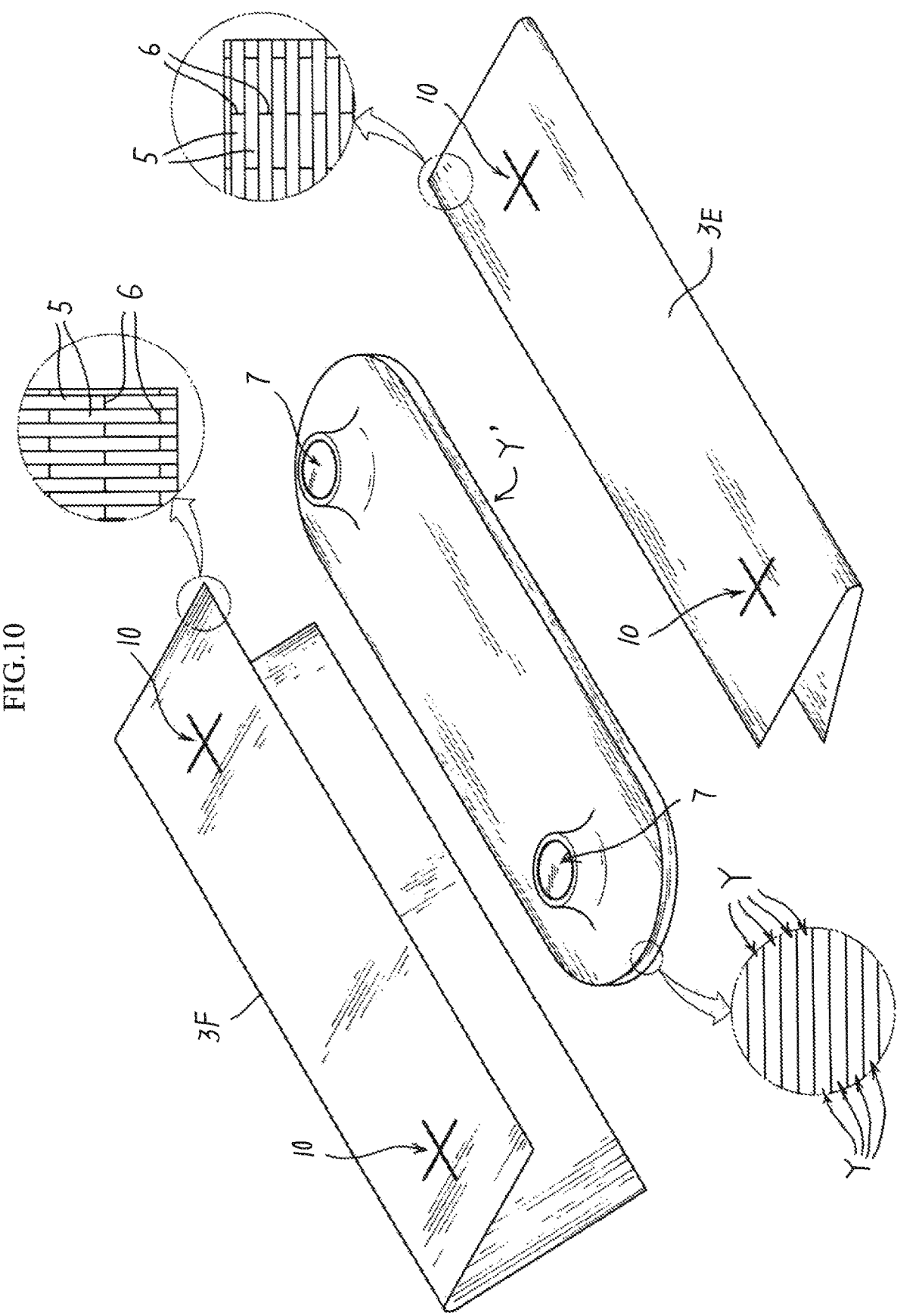
FIG. 10 is a diagram for illustrating the process of manufacturing example 1.

As depicted in FIG. 10, the fifth fiber bodies 3E are configured such that the longitudinal direction of the carbon fiber bundles 5 is set to 0°, parallel to the longitudinal direction of the layered structure section 1 (pieces in which the CF pre-preg is cut such that the longitudinal direction of the carbon fiber bundles 5 is parallel to the longitudinal direction of the layered structure section 1: 0°-direction elements).

As depicted in FIG. 10, the sixth fiber bodies 3F are configured such that the longitudinal direction of the carbon fiber bundles 5 is set to 90°, intersecting the longitudinal direction of the layered structure section (pieces in which the CF pre-preg is cut such that the longitudinal direction of the carbon fiber bundles 5 is perpendicular to the longitudinal direction of the layered structure section 1: 90°-direction elements).

Slits 10 are provided in each of the fifth fiber bodies 3E and the sixth fiber bodies 3F for the metal bodies 7 to pass through (at central sections 200 mm apart, located at 45 mm from both end sections).

Specifically, as depicted in FIG. 10, 25-30 mm cross-shaped slits 10 are formed in the fifth fiber bodies 3E and the sixth fiber bodies 3F in the 0° and 90° directions, the slits 10 being formed at four locations (four corners) at the front, back, left, and right.

Next, as depicted in FIG. 10, the sixth fiber bodies 3F obtained as described above are layered so as to wrap over the layered structure body Y' from left to right. When this action is performed, the upper and lower portions of the metal bodies 7 are passed through the slits 10 at the top, bottom, left, and right of the sixth fiber bodies 3F, and the flange-form sections 7b and main bodies 7a are pressed against.

The fifth fiber bodies 3E are then wrapped over the entity wrapped by the sixth fiber bodies 3F from right to left. When this action is performed, the upper and lower portions of the metal bodies 7 are passed through the slits 10 at the top, bottom, left, and right of the fifth fiber bodies 3E, and the flange-form sections 7b and main bodies 7a are pressed against.

Figure 11:
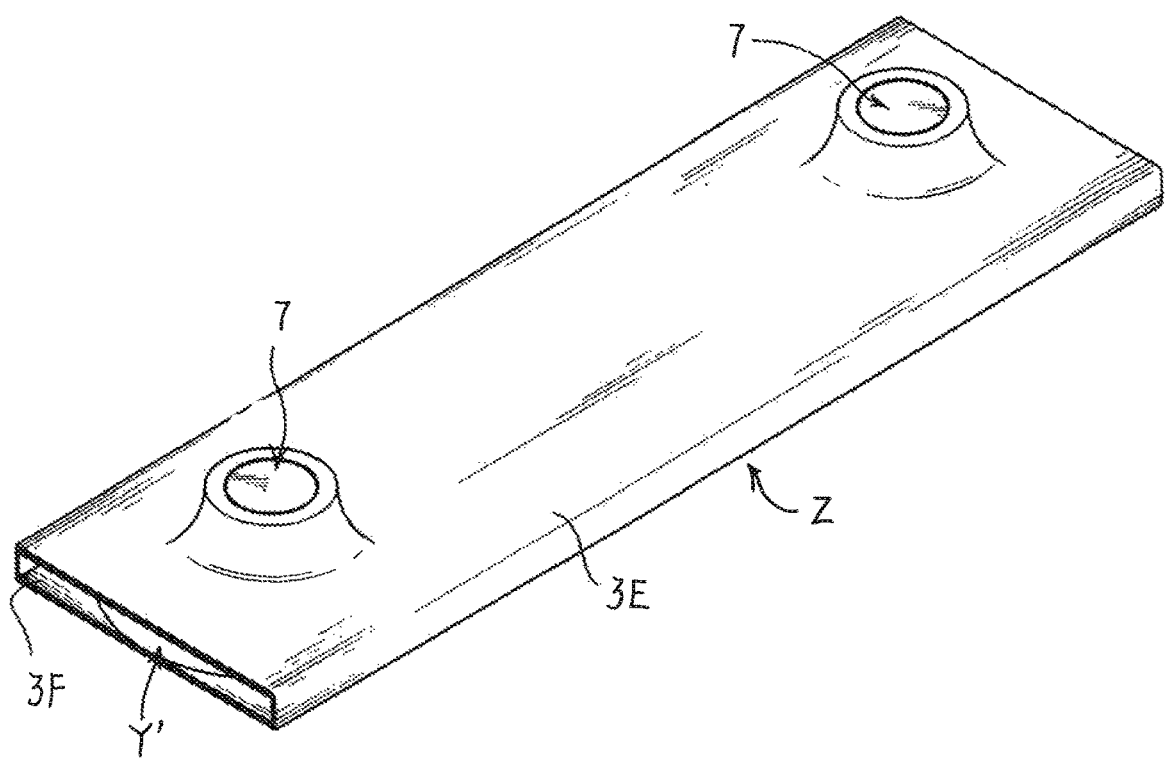
FIG. 11 is a diagram for illustrating the process of manufacturing example 1.

This results in a layered structure Z constructed in the form of a box in which the outermost layer is provided in the form of a pouch binding from both the left and right by the fifth fiber bodies 3E (0°-direction elements) and the sixth fiber bodies 3F (90°-direction elements) (see FIG. 11). The fifth fiber bodies 3E and the sixth fiber bodies 3F may also form a structure in which the fifth fiber bodies 3E are wrapped over first, whereupon the sixth fiber bodies 3F are wrapped thereover.

When torsional rigidity is required in the link rod X manufactured in the present example, the following cover elements may also be provided.

Specifically, a square CF pre-preg is cut into rectangles having a 170 mm width and a 290 mm length, forming two types of fiber bodies 3 (seventh fiber bodies and eighth fiber bodies; not shown).

The seventh fiber bodies are configured such that the longitudinal direction of the carbon fiber bundles 5 is set to +45°, intersecting the longitudinal direction of the layered structure section 1 (pieces in which the CF pre-preg is cut such that the longitudinal direction of the carbon fiber bundles 5 rises rightward at 45° relative to the longitudinal direction of the layered structure section 1: +45°-direction elements).

The eighth fiber bodies are configured such that the longitudinal direction of the carbon fiber bundles 5 is set to −45°, intersecting the longitudinal direction of the layered structure section 1 (pieces in which the CF pre-preg is cut such that the longitudinal direction of the carbon fiber bundles 5 drops rightward at 45° relative to the longitudinal direction of the layered structure section 1: −45°-direction elements).

Slits are provided in each of the seventh fiber bodies and the eighth fiber bodies for the metal bodies 7 to pass through (at central sections 200 mm apart, located at 45 mm from both end sections).

Specifically, 25-30 mm cross-shaped slits are formed in the seventh fiber bodies and the eighth fiber bodies in the +45° and −45° directions, the slits being formed at four locations (four corners) at the front, back, left, and right.

Next, the eighth fiber bodies obtained as described above are layered so as to wrap over the layered structure body from left to right. When this action is performed, the upper and lower portions of the metal bodies 7 are passed through the slits at the top, bottom, left, and right of the eighth fiber bodies, and the flange-form sections 7b and main bodies 7a are pressed against.

The seventh fiber bodies are then wrapped over the entire article that has been wrapped with the eighth fiber bodies from right to left. When this action is performed, the upper and lower portions of the metal bodies 7 are passed through the slits at the top, bottom, left, and right of the seventh fiber bodies and the flange-form sections 7b and main bodies 7a are pressed against.

This yields a box structure in which the outermost layer is provided in the form of a pouch binding from both the left and right by the seventh fiber bodies (+45°-direction elements) and the eighth fiber bodies (−45°-direction elements). The seventh fiber bodies and the eighth fiber bodies may also form a structure in which the seventh fiber bodies are wrapped over first, whereupon and the eighth fiber bodies are wrapped thereover, and furthermore, the fifth fiber bodies 3E, the sixth fiber bodies 3F, the seventh fiber bodies, and the eighth fiber bodies may all be layered so as to be wrapped in alternation around the entirety of the layered structure body Y' from the left and the right.

Next, the layered structure Z is attached by thread 8 passing through in the layering direction of the fiber bodies 3.

Figure 12:
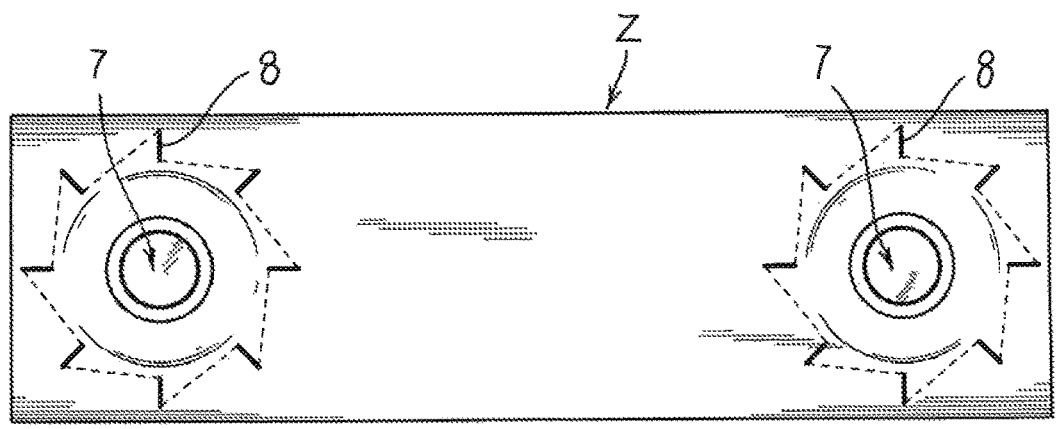
FIG. 12 is a diagram for illustrating the process of manufacturing example 1.

Specifically, one thread (or two threads) of Torayca T800HB 6K (223 tex) thread are passed through a Senkichi tatami stitching needle (sold by Fujiwara Industrial Co., Ltd.) No. 11 and, as seen in the planar direction as depicted in FIG. 12, the thread 8 is sewn in the pass-through direction, without being cut, at eight sites in the horizontal direction, the vertical direction, the +45° direction, and the −45° direction around the metal bodies 7 at the left and right, such that the seams appear in a radial pattern at the top and bottom surfaces. Supplemental thread is left at the starting point of the stitching and, after sewing around the metal bodies 7, the thread at the starting point and the thread at the ending point are tied together.

Aside from the Torayca T800HB 6K (223 tex) thread, the thread (carbon fiber) passed through the stitching needle may, for example, be MR70 12P (415 tex) thread, manufactured by Mitsubishi Chemical Corporation, which is stronger than the Torayca T800 HB thread. In terms of elasticity, polyacrylonitrile (PAN) thread (1.7%-1.9% elasticity), rather than pitch thread (0.4-0.8% elasticity) is preferably used as the carbon fiber passing through the stitching needle.

Often, in many cases, the weaving densities of the warp threads and the weft threads in a carbon fiber cloth are substantially the same (for example, a weaving density of 12.5 warp threads per 25 mm and 12.5 weft threads per 225 mm, using Torayca T300 3K (198 tex) carbon fibers manufactured by Toray Industries, Inc., having a basis weight of 198 g/m2). Layering such a cloth into the above-described layered structure Z would result in an excessive density of seams in the layered structure Z, leading to difficulties in passing the stitching needle therethrough. In the case of the fiber bodies 3 (CF pre-preg) of the present example, the weft threads are sparsely distributed and the stitching needle is easily able to pass therethrough, thereby enabling stitching with the stitching needle in the pass-through direction.

Figure 13:
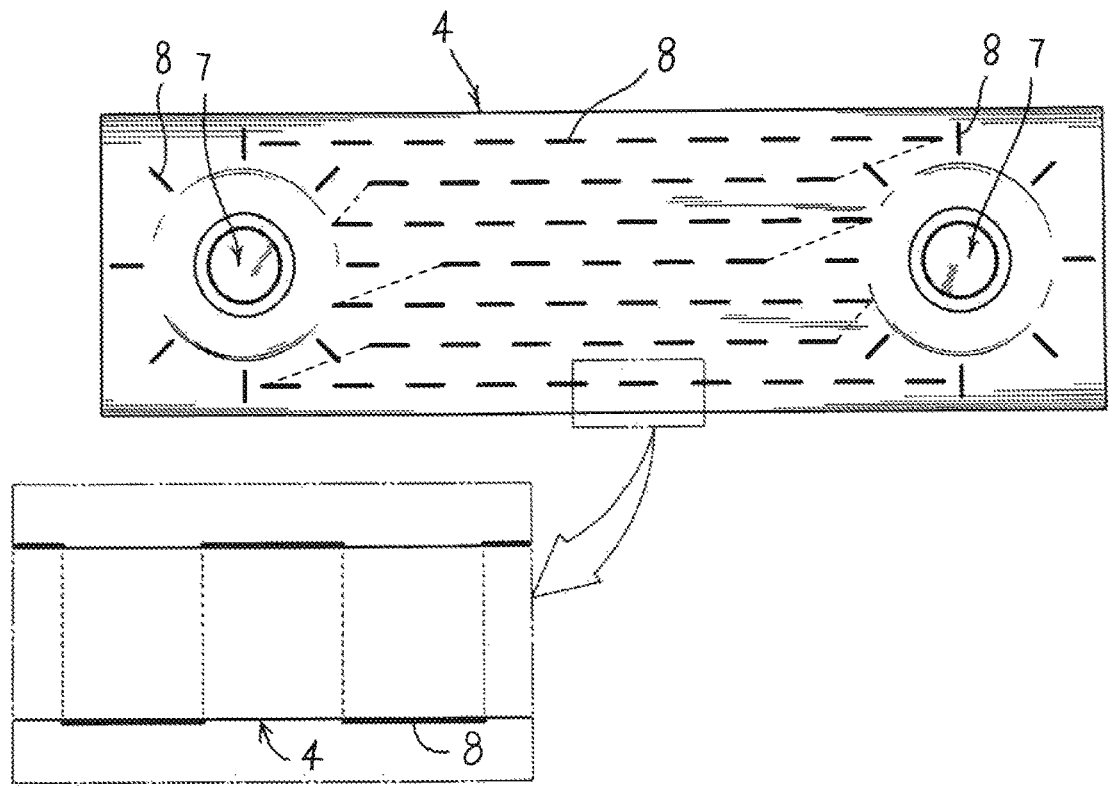
FIG. 13 is a diagram for illustrating the process of manufacturing example 1.

In a flat portion (between the metal bodies 7) of the layered structure Z, once stitching around the left and right metal bodies 7 is complete, one thread (or two threads) of Torayca T800HB 6K (223 tex) thread are passed through a Senkichi tatami stitching needle (sold by Fujiwara Industrial Co., Ltd.) No. 11 and, as depicted in FIG. 13, stitching is performed in the pass-through direction at 1 cm intervals along the length direction of the layered structure Z. As seen in the planar direction, 1 cm of the thread 8 is at the front surface layer and 1 cm of the thread 8 is at the rear surface layer, such that the front surface layer thread is visible at 1 cm intervals. This pattern is replicated along the entire 80 mm width. Specifically, after sewing from one end side to the other end side of the layered structure Z, the position in the longitudinal direction is changed and sewing then proceeds from the other end side to the one end side, a plurality of stitched rows being formed by performing this back-and-forth stitching step a plurality of times. Seams in adjacent stitched rows preferably do not line up, such that the threads are offset similarly to a zigzag lattice. Ultimately, seven stitched rows will be visible in the flat portion (between the metal bodies 7) of the 80 mm width of the layered structure Z.

The layered structure Z that has been subjected to the above-described stitching step serves as the layered body 4.

In the present example, a wave stitch is presented as an example; however, a half backstitch or a full backstitch may also be used. Using a half backstitch or a full backstitch yields a higher thread density in the pass-through direction than when a wave stitch is used, and as such, although it is possible to minimize peeling between the layers of the layered body 4, the fibers become bound similarly to NCF. Accordingly, the pitch of a first and second half backstitch or full backstitch is preferably set, as appropriate, in accordance with the viscosity of the resin of the coated pre-preg and with the number of layers.

In the present example, the stitching step is performed manually; however, provided that a similar stitching format is obtained, a mechanism such as a sewing machine having upper thread and lower thread may also be used.

Figure 14:
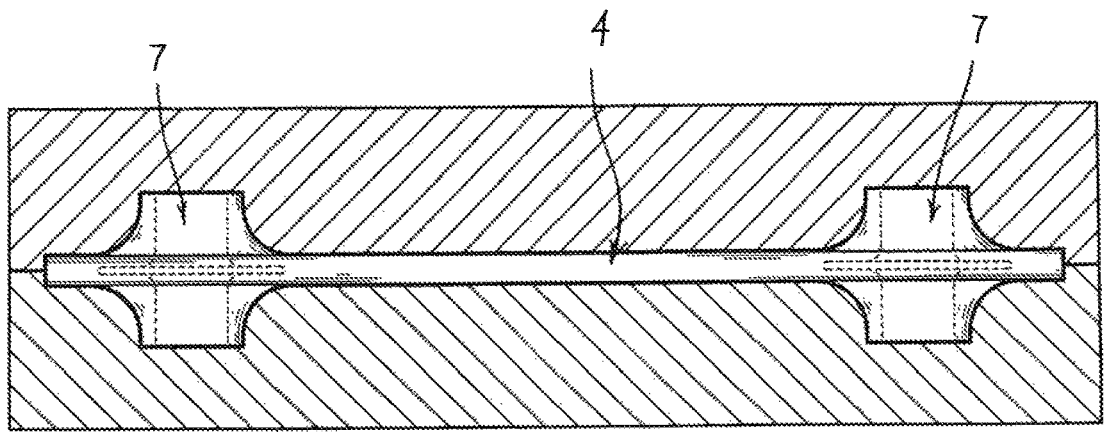
FIG. 14 is a diagram for illustrating the process of manufacturing example 1.

Next, the layered body 4 is coated with an epoxy resin and set in a predefined mold. Curing of the epoxy resin progresses through the application of pressure and heat via autoclave molding or press molding under predefined curing conditions, and a CFRP member is obtained (FIG. 14). The molding may also be performed using RTM molding or VARTM molding similarly using layering and stitching, as well.

Both end sections of the resulting CFRP member are rectangular in the box structure layering step. As such, the two end sections are machined into an arcuate form and, given that the metal bodies 7 are solid, a finishing process is applied by forming through-holes having a ø11 mm diameter at a preset pitch of 200 mm, thereby completing the link rod X (see FIG. 1).

Even if, for example, the link rod X is secured at the left-hand end and a force is applied in the vertical direction to the right-hand end, inter-layer peeling in the layered structure section 1 relative to the moment of curvature is prevented by the stitched carbon fibers.

Also, even if the link rod X is secured at the left-hand end and a force is applied in a twisting direction rotating the right-hand end, the torsional rigidity will be superior to that of a typical layered body due to the second fiber bodies 3B (+45° layers) and the third fiber bodies 3C (−45° layers) of the layered structure section 1, and due to the box structure layers formed by the fifth fiber bodies 3E and the sixth fiber bodies 3F. Furthermore, inter-layer peeling of the layered structure section 1 due to the twisting force is prevented by the stitched carbon fibers.

The layered structure section 1 of the present example is, as described above, layered such that the fourth fiber bodies 3D, the third fiber bodies 3C, the second fiber bodies 3B, and the first fiber bodies 3A are layered symmetrically in the stated order in each of the upward and downward directions on either side of a thickness-direction center section. This enables strain originating in the layering configuration to be reduced.

The CFRP material, being layered in this layer configuration with horizontal-cross-section symmetry, yields a molded product devoid of warping and torsion. In order to suppress internal strain caused by the layer structure or any increase to the strain in the layer structure due to curing contraction after molding, the horizontal cross-section is preferably layered so as to have axial symmetry when, as in the present example, a plurality of pre-pregs are layered together.

The present example, configured as described above, produces the following effects.

Despite the unidirectional orientation of the fibers, the warp threads and the weft threads do not become displaced even when not in the pre-preg state (i.e., even when not impregnated with resin) and may therefore be cut into a desired shape and shaped in a form (mold).

Pre-preg coating of a cloth base material by a coating device is also possible. Therefore, the coating in the pre-preg coating is possible whether a vertical coating device, which is appropriate for a standard UD pre-preg, or a horizontal coating device (a coating device mainly suitable for cloth pre-pregs), which is not appropriate for a standard UD pre-preg, is used. Furthermore, regardless of whether the epoxy resin is a non-solvent or solvent-containing resin formulation, or whether a horizontal or vertical coating device is used, all resin formulations and coating device types can be complied with, and the desired resin content may be controlled.

In the present example, the warp thread density is high and the weft thread density is low such that inter-layer peeling is easily preventable by stitching the layered body 4 in the pass-through direction with the thread 8.

In other words, inter-layer peeling often occurs with CFRP materials in the layered body due to fatigue and stress concentration around a bolt fastening at connection sections 2, and as such, the bolt fastening may loosen or fatigue breakdown of the CFRP element may occur around the (bolt) fastening. However, the connection sections of the present example are structured so as to avoid stress concentration through the superimposition (overlaying) of the CFRP with the metal bodies 7 having rounded flange-form sections 7b. Furthermore, inter-layer peeling, which is of greatest concern in fatigued CFRP material members, may be suppressed by stitching around the connection sections 2 and therebetween in the pass-through direction.

When the unidirectional fiber bodies of the present example are used, and layering is performed by a robot hand, regardless of whether a carbon fiber unidirectional material not impregnated with resin is used, or a pre-preg that has been impregnated with resin is used, the fibers do not become displaced even when grasped by the robot hand given that the warp threads are heat-set.

The present example is applicable to any of RTM molding, VARTM molding, press molding, and autoclave molding.

Example 2

A method for manufacturing a link rod X that has a circular (round) cross-section used in a vehicle structure is described below.

Figure 15:
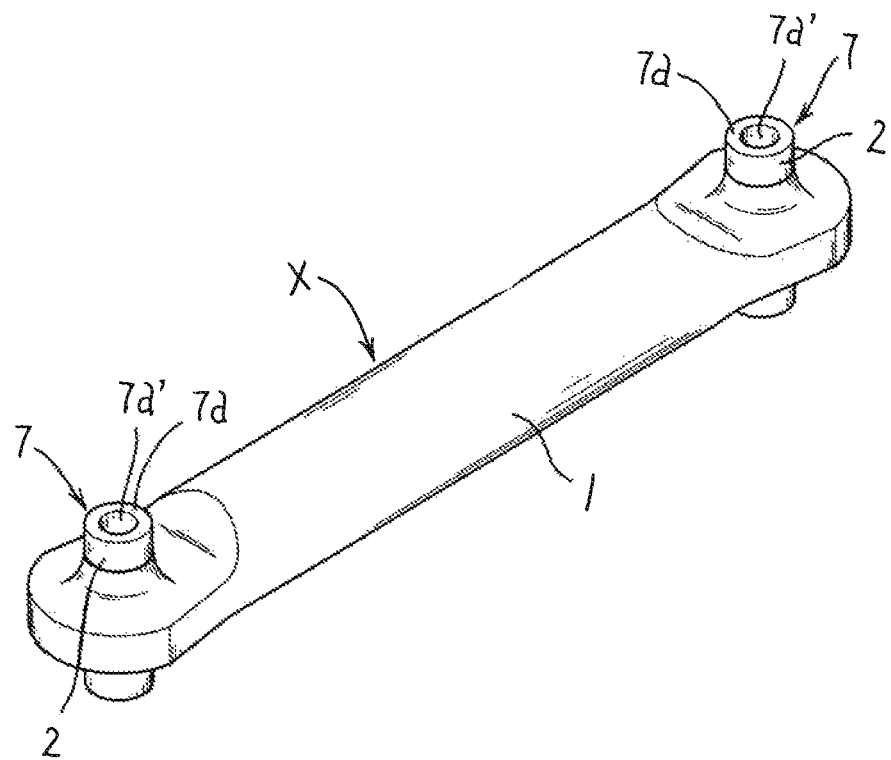
FIG. 15 is a perspective view of example 2.
Figure 16:
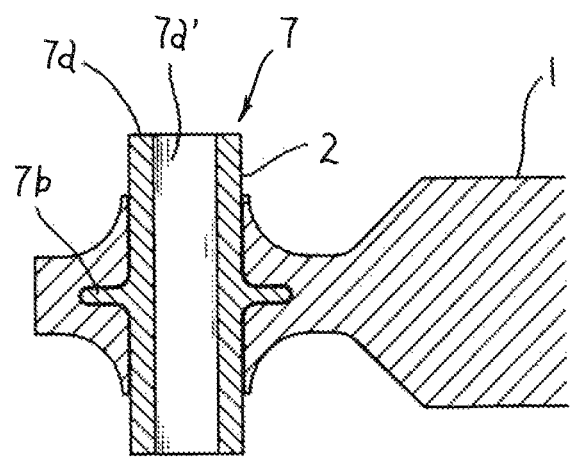
FIG. 16 is a cross-sectional view of key sections of example 2.

The link rod X has, as indicated in FIG. 15, a 250 mm total length, a trunk body section that has a rounded horizontal cross-section, and two end sections that have a rectangular horizontal cross-section, and has a hybrid structure in which a layered structure section 1 (CFRP) is provided with connection sections 2 formed from metal bodies 7 at the left and right end sections thereof (described later). As indicated in FIGS. 15 and 16, the metal bodies 7 are each configured from a suitable metal member (7075 duralumin), each having a columnar main body 7a that has a ⌀15 mm diameter and a 42 mm length, and a flange-form section 7b that is machined into the circumferential-surface central section of the main body 7a so as to have a 2 mm thickness and a ⌀28 mm diameter.

The metal bodies 7 are each provided with a ⌀8.5 mm hole 7a' during finishing processing, the distance between the hole centers being set to 200 mm.

The flange-form sections 7b will be sandwiched between layers of the fiber bodies 3 (CF pre-preg), which are layered as described below. As such, the outer circumference of each of the flange-form sections 7b is rounded off rather than being squared off in order to avoid stress concentration when forces are applied to the link rod X. The rounded shape serves as an overlaid layer and therefore contributes to improving the force of adhesion between the metal bodies 7 and the fiber bodies 3 (CF pre-preg).

The square sheet of CF pre-preg (not shown) provided as described above is cut into a rectangular shape having a predefined size, being specifically formed into the four types of fiber bodies 3 (first fiber bodies 3A, second fiber bodies 3B, third fiber bodies 3C, fourth fiber bodies 3D (described later)).

The CF pre-preg cutting step may involve either manual cutting using a cutting tool such as a cutter, scissors, etc., or be performed using a laser cutter, a pre-preg cutter machine, etc.

The first fiber bodies 3A are configured such that the longitudinal direction of the carbon fiber bundles 5 is set to 0°, parallel to the longitudinal direction of the layered structure section 1 (pieces in which the CF pre-preg is cut such that the longitudinal direction of the carbon fiber bundles 5 is parallel to the longitudinal direction of the layered structure section 1: 0°-direction elements).

Figure 17:
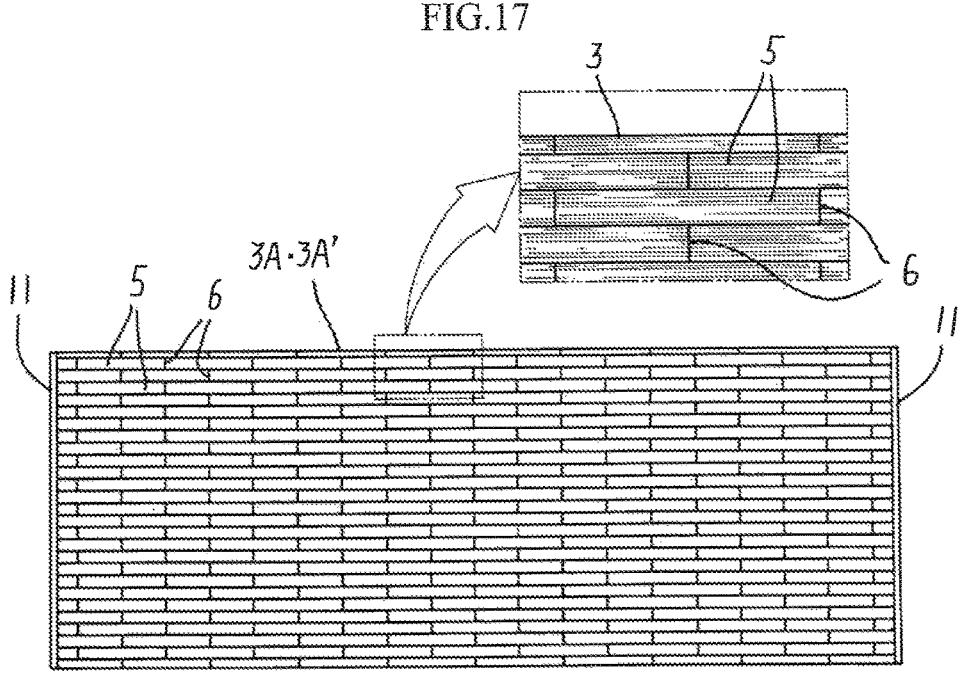
FIG. 17 is a plan view of the key sections of example 2.
Figure 21:
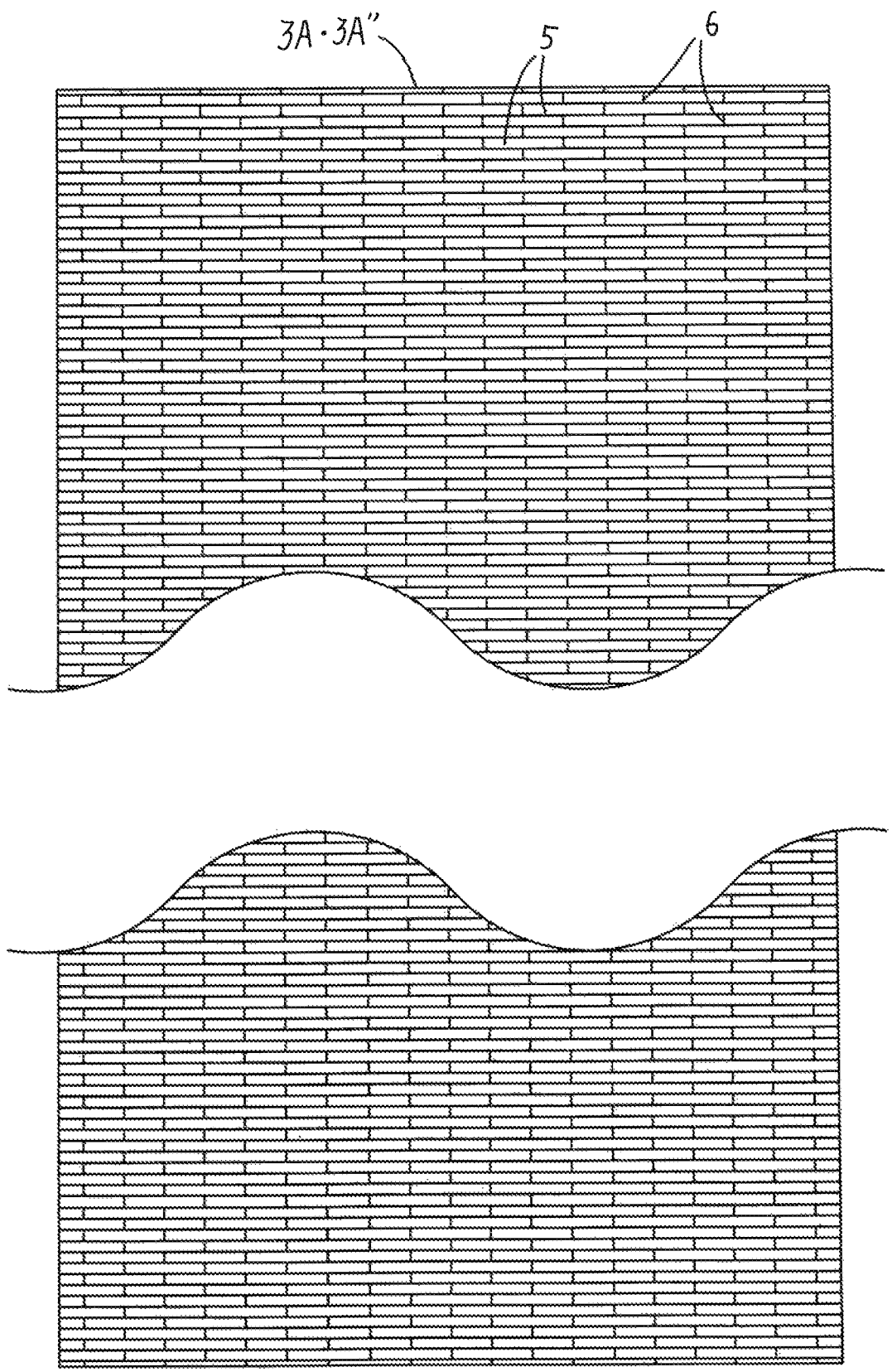
FIG. 21 is a plan view of the key sections of example 2.

In the present example, the first fiber bodies 3A are provided in two types, namely first fiber bodies 3A' having the size depicted in FIG. 17 (250+5/-0 mm width, 92+5/-0 mm length), and first fiber bodies 3A" having the size depicted in FIG. 21 (250+5/-0 mm width, 570+5/-0 mm length).

White portions 11 are applied to the left- and right-end edge sections of the smaller first fiber bodies 3A' reaching a 92 mm length (when subsequently wound into the form of a shaft, the horizontal-cross-section center section becomes a round white portion 11, the white portion 11 serving as a marker of the round-cross-section center).

The second fiber bodies 3B are configured such that the longitudinal direction of the carbon fiber bundles 5 is set to +45°, intersecting the longitudinal direction of the layered structure section 1 (pieces in which the CF pre-preg is cut such that the longitudinal direction of the carbon fiber bundles 5 rises rightward at 45° relative to the longitudinal direction of the layered structure section 1: +45°-direction elements).

Figure 18:
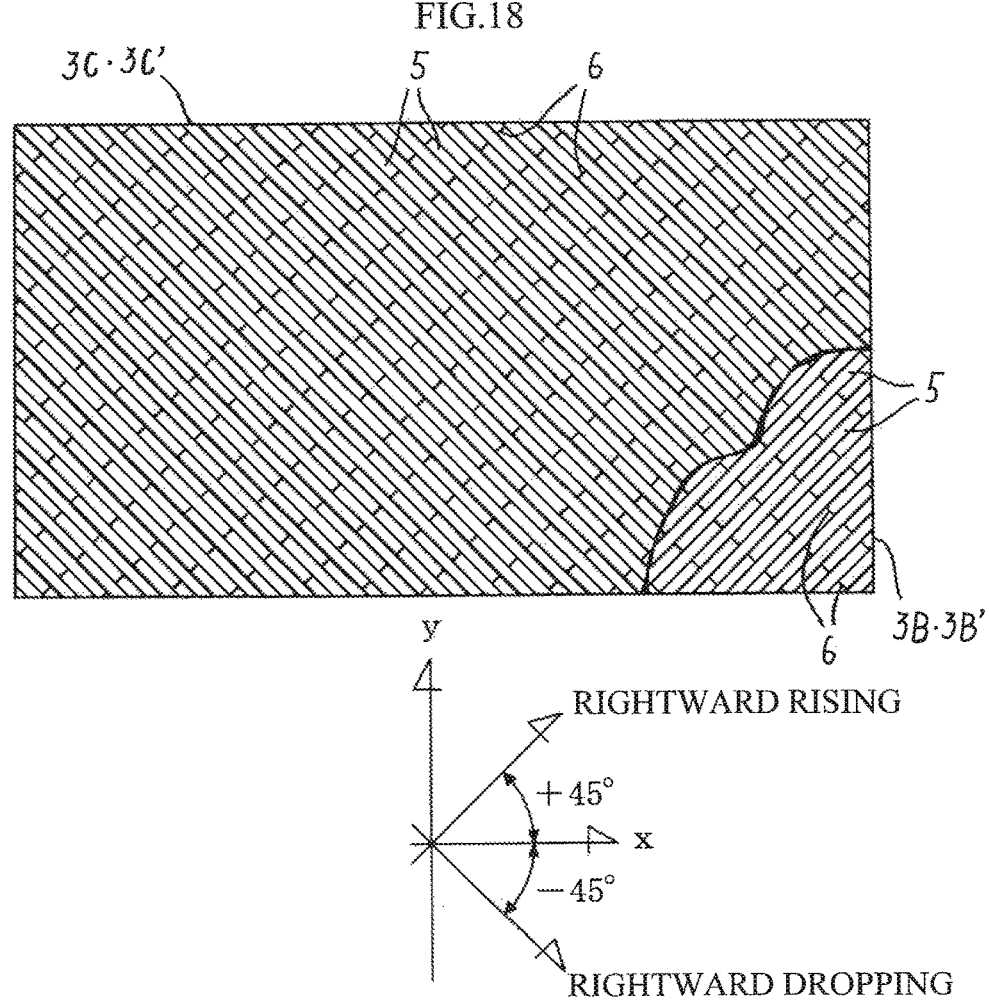
FIG. 18 is a plan view of the key sections of example 2.
Figure 20:
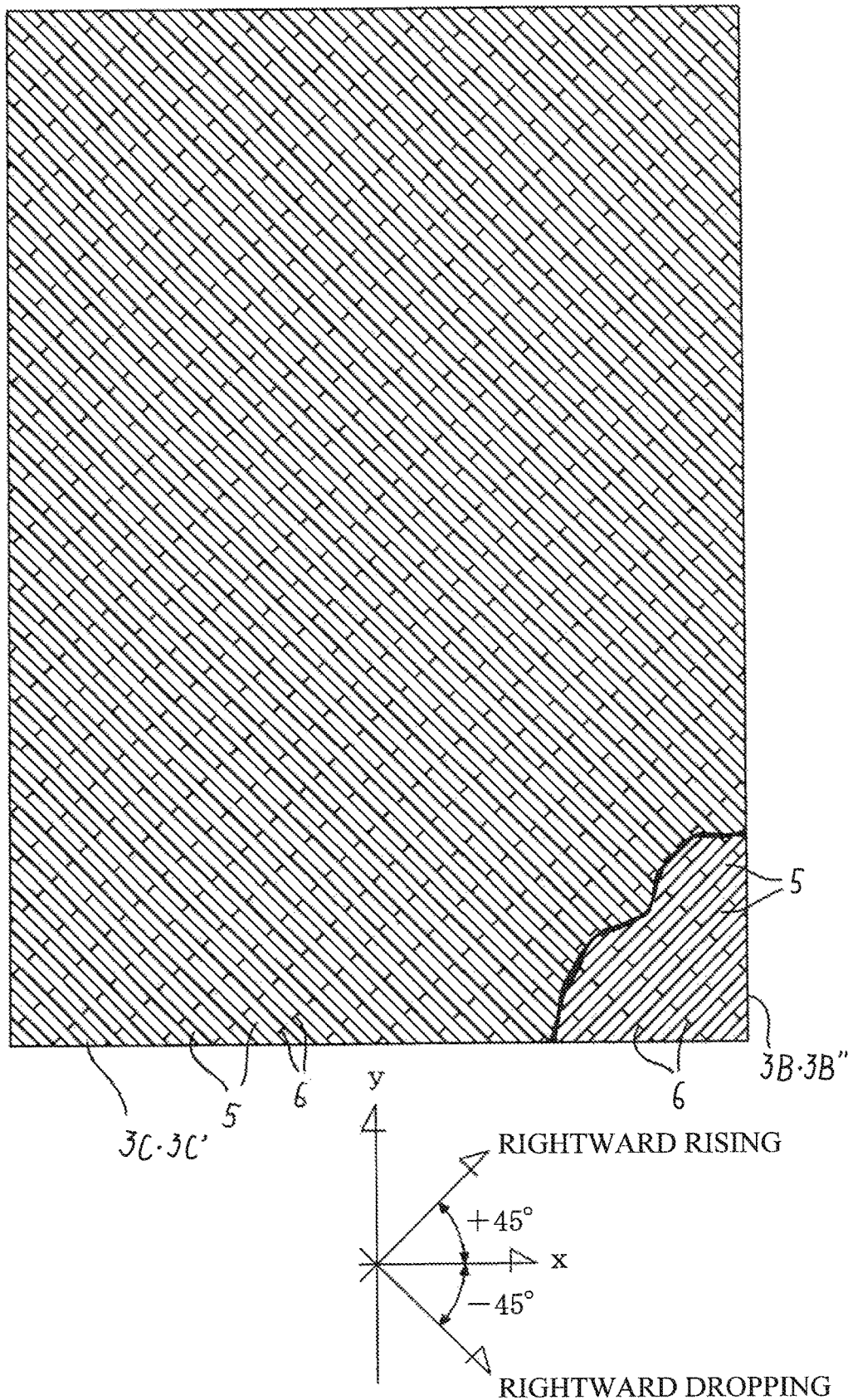
FIG. 20 is a plan view of the key sections of example 2.

In the present example, the second fiber bodies 3B are provided in two types, namely second fiber bodies 3B' having the size depicted in FIG. 18 (250+5/-0 mm width, 138+5/-0 mm length), and second fiber bodies 3B" having the size depicted in FIG. 20 (250+5/-0 mm width, 353+5/-0 mm length). In FIGS. 18 and 20, the x-axis is the longitudinal direction of the layered structure section 1, and the y-axis is the direction perpendicular to the longitudinal direction of the layered structure section 1.

As depicted in FIGS. 18 and 20, regarding the second fiber bodies 3B and the third fiber bodies 3C (described later), two types thereof having the same size are overlaid in advance. Two types of the overlaid second fiber bodies 3B and third fiber bodies 3C of the respective sizes are provided.

The third fiber bodies 3C are configured such that the longitudinal direction of the carbon fiber bundles 5 is set to -45°, intersecting the longitudinal direction of the layered structure section 1 (pieces in which the CF pre-preg is cut such that the longitudinal direction of the carbon fiber bundles 5 drops rightward at 45° relative to the longitudinal direction of the layered structure section 1: -45°-direction elements).

In the present example, the third fiber bodies 3C are provided in two types, namely third fiber bodies 3C' having the size depicted in FIG. 18 (250+5/-0 mm width, 138+5/-0 mm length), and third fiber bodies 3C" having the size depicted in FIG. 20 (250+5/-0 mm width, 353+5/-0 mm length).

The fourth fiber bodies 3D are configured such that the longitudinal direction of the carbon fiber bundles 5 is set to 90°, intersecting the longitudinal direction of the layered structure section 1 (pieces in which the CF pre-preg is cut such that the longitudinal direction of the carbon fiber bundles 5 is perpendicular to the longitudinal direction of the layered structure section 1: 90°-direction elements).

Figure 19:
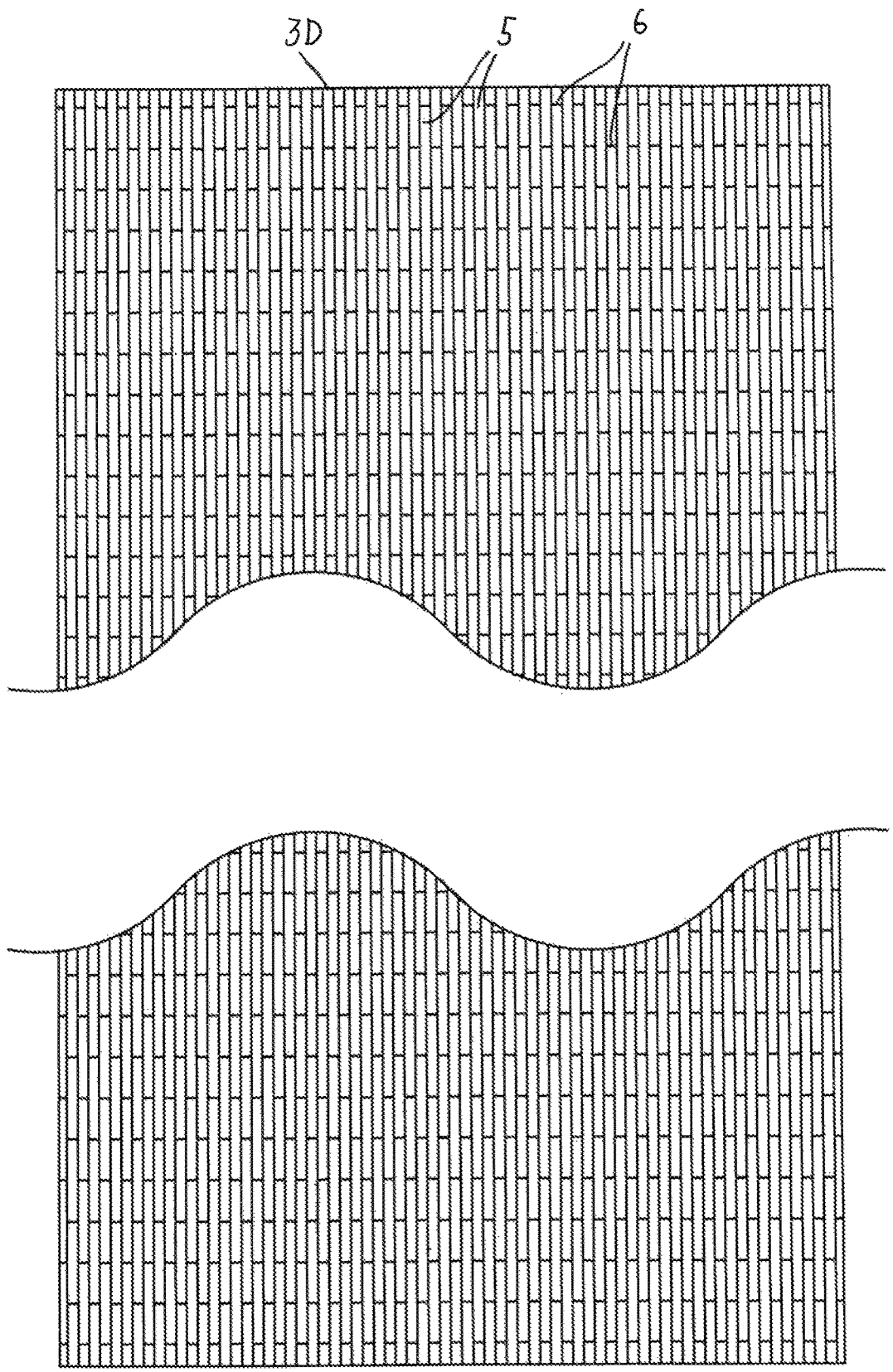
FIG. 19 is a plan view of the key sections of example 2.

In the present example, the fourth fiber bodies 3D are provided as the fiber bodies 3D having the size depicted in FIG. 19 (250+5/-0 nm width, 648+5/-0 mm length).

Next, the first fiber bodies 3A (first fiber bodies 3A', first fiber bodies 3A"), the second fiber bodies 3B (second fiber bodies 3B', second fiber bodies 3B"), the third fiber bodies 3C (third fiber bodies 3C', third fiber bodies 3C"), and the fourth fiber bodies 3D, obtained as described above, are wound, and a layered structure body y' is obtained.

This layered structure body y' is in the form of a rod, and includes: a first layer section 4A provided by winding the first fiber bodies 3A'; a second layer section 4B, provided by winding the second fiber bodies 3B' and the third fiber bodies 3C' in an overlaid state about the first layer section 4A; a third layer section 4C, provided by winding the fourth fiber bodies 3D about the second layer section 4B; a fourth layer section 4D, provided by winding the second fiber bodies 3B" and the third fiber bodies 3C" in an overlaid state about the third layer section 4C; and a fifth layer section 4E, provided by winding the first fiber bodies 3A about the fourth layer section 4D.

Either of the second fiber bodies 3B and the third fiber bodies 3C may be on the outer side or on the inner side when overlaid.

Figure 22:
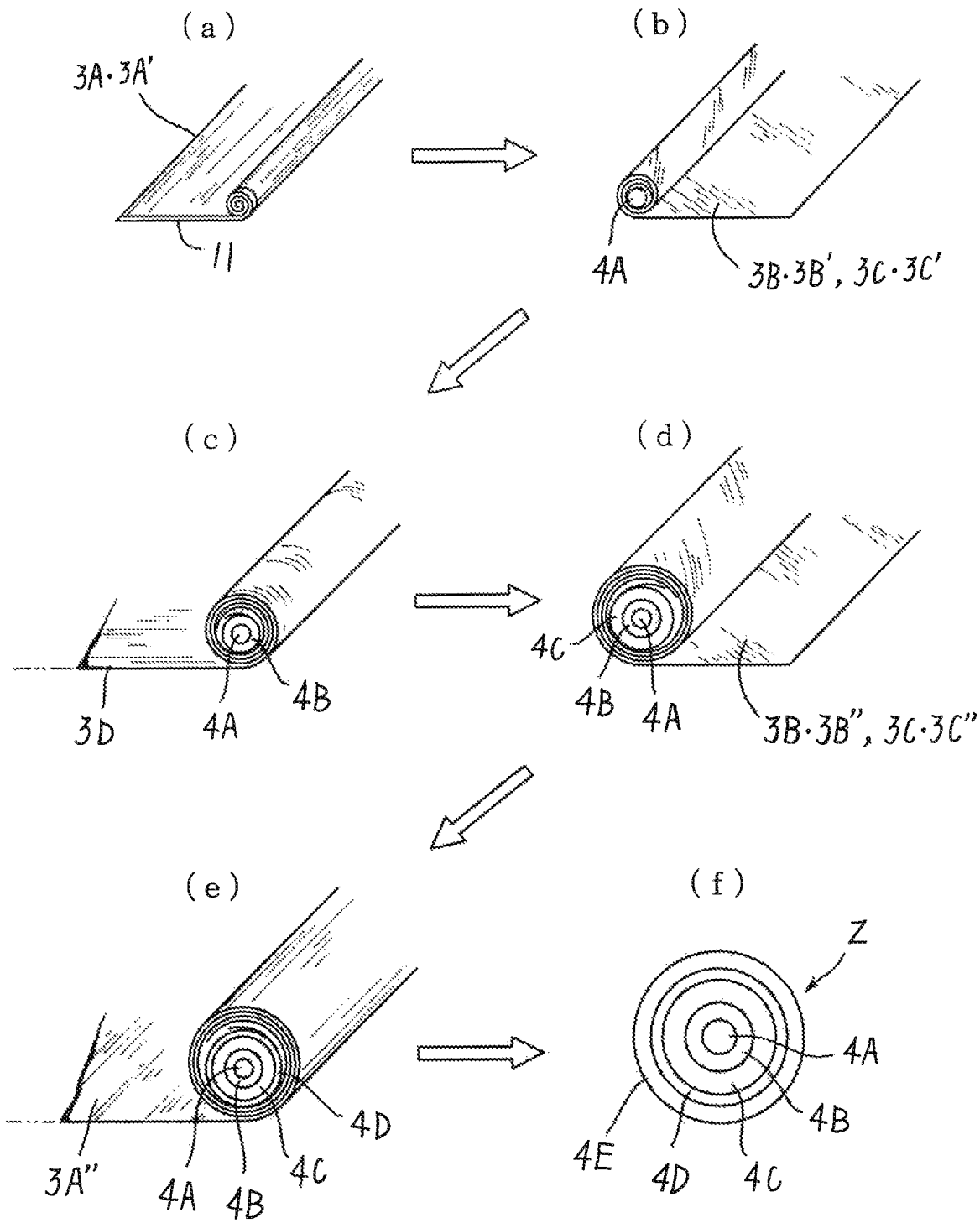
FIG. 22 is an explanatory diagram of the manufacturing process of example 2.

Specifically, the first fiber bodies 3A' (0°-direction elements) are wound such that the longitudinal direction of the carbon fiber bundles 5 are parallel (0°) to the longitudinal direction of the layered structure section 1 (FIG. 22A).

When this action is performed, the first fiber bodies 3A' are wound such that a first carbon fiber bundle 5, located at a winding-starting-end section at the winding start time, and a neighboring second carbon fiber bundle 5 are overlaid, creating a central body, the central body then being further overlaid on a third carbon fiber bundle 5. The outside diameter of the central body is subsequently increased so that there is no excess of the first fiber bodies 3A' (such that there are no spaces between one layer and a preceding layer). As a result, a columnar body (first layer section 4A) measuring approximately 6 mm in diameter is formed from the first fiber bodies 3A'.

Next, a winding-starting-end section of the second fiber bodies 3B' (+45° direction elements) and the third fiber bodies 3C' (−45° direction elements), which are overlaid, is affixed via the tack (adhesiveness) of the pre-preg onto a location 2-3 mm away from the winding-finishing-end section of the first layer section 4A configured from the first fiber bodies 3A', which has a 6 mm diameter. A second layer section 4B is formed by winding the fiber bodies such that there is no excess (such that there are no gaps between one layer and a preceding layer) (FIG. 22B). As a result, a columnar body measuring approximately 12 mm in diameter is formed from the first fiber bodies 3A', the second fiber bodies 3B', and the third fiber bodies 3C'.

Figure 23:
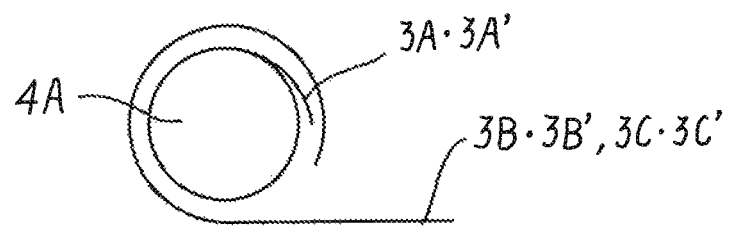
FIG. 23 is an explanatory diagram of the manufacturing process of example 2.

When this action is performed, as depicted in FIG. 23, the winding direction of the first layer section 4A (first fiber bodies 3A') and the winding direction of the second layer section 4B (second fiber bodies 3B' and third fiber bodies 3C') are different. In other words, if the winding direction of the first layer section 4A is clockwise, then the winding direction of the second layer section 4B is counter-clockwise.

Next, a winding-starting-end section of the fourth fiber bodies 3D (90°-direction elements) is affixed via the tack (adhesiveness) of the pre-preg onto a location 2-3 mm away from the winding-finishing-end section of the second layer section 4B configured from the second fiber bodies 3B' and the third fiber bodies 3C'. A third layer section 4C is formed by winding the fiber bodies such that there is no excess (such that there are no gaps between one layer and a preceding layer) (FIG. 22C). As a result, a columnar body measuring approximately 20 mm in diameter is formed from the first fiber bodies 3A', the second fiber bodies 3B', the third fiber bodies 3C', and the fourth fiber bodies 3D.

When this action is performed, the winding direction of the second layer section 4B and the winding direction of the third layer section 4C are different. In other words, if the second layer section 4B is counter-clockwise, then the winding direction of the third layer section 4C is clockwise.

It should be noted that a configuration may also be employed in which the fourth fiber bodies 3D (90°-direction elements) are wound around the outer circumference of the layer in which the first fiber bodies 3A' (0°-direction elements) are wound. However, winding in the direction perpendicular to the warp threads (winding in the direction in which the carbon fiber bundles 5 bend) leads to spring-back occurring in the carbon fiber bundles 5, making it much harder to form a columnar body.

The spring-back phenomenon occurs in cloth materials in which the densities of the warp threads and the weft threads are substantially the same. With the unidirectional fiber base material of the present example, even when the outside diameter of the columnar body is small, the first fiber bodies 3A' can be wound without spring-back provided that the first fiber bodies 3A' are wound as described above.

A smaller outside diameter corresponds to a more dramatic spring-back phenomenon produced when winding in the direction perpendicular to the warp threads. However, by using the tack (adhesiveness) of the pre-preg when the outside diameter is 12 mm, as in the present example, the outside diameter of the central body may continue to increase such that there is no excess of the fiber bodies (such that there are no gaps between one layer and a preceding layer). In trial production, the present inventors found that when winding and layering the fourth fiber bodies 3D (90°-direction elements), the outside diameter of the wound body being layered is preferably roughly 10 mm or more. At 10 mm or more, the spring-back phenomenon can be suppressed via the bonding strength of the pre-preg resin, and the winding and layering may be performed without an excess of pre-preg.

Next, a winding-starting-end section of the second fiber bodies 3B" (+45°-direction elements) and the third fiber bodies 3C" (−45°-direction elements), which are overlaid, is affixed via the tack (adhesiveness) of the pre-preg onto a location 2-3 mm away from the winding-finishing-end section of the third layer section 4C configured from the fourth fiber bodies 3D. A fourth layer section 4D is formed by winding the fiber bodies such that there is no excess (such that there are no gaps between one layer and a preceding layer) (FIG. 22D). As a result, a columnar body having a roughly 26 mm diameter is formed from the first fiber bodies 3A', the second fiber bodies 3B', the third fiber bodies 3C', the fourth fiber bodies 3D, the second fiber bodies 3B", and the third fiber bodies 3C".

When this action is performed, the winding direction of the third layer section 4C and the winding direction of the fourth layer section 4D are different. In other words, if the winding direction of the third layer section 4C is clockwise, then the winding direction of the fourth layer section 4D is counter-clockwise.

Next, a winding-starting-end section of the first fiber bodies 3A" (0°-direction elements) is affixed via the tack (adhesiveness) of the pre-preg onto a location 2-3 mm away from the winding-finishing-end section of the fourth layer section 4D configured from the second fiber bodies 3B" and the third fiber bodies 3C". A fifth layer section 4E (FIG. 22F) is formed by winding the fiber bodies such that there is no excess (such that there are no gaps between one layer and a preceding layer) (FIG. 22E). As a result, a columnar body having a roughly 30 mm diameter is formed from the first fiber bodies 3A', the second fiber bodies 3B', the third fiber bodies 3C', the fourth fiber bodies 3D, the second fiber bodies 3B", the third fiber bodies 3C", and the first fiber bodies 3A".

When this action is performed, the winding direction of the fourth layer section 4D and the winding direction of the fifth layer section 4E are different. In other words, if the winding direction of the fourth layer section 4D is counter-clockwise, then the winding direction of the fifth layer section 4E is clockwise.

The layered structure body y', obtained as described above, forms a columnar body that is wound and layered, and as such, has axial symmetry in diametrical cross-section, while also having axial symmetry in radial cross-section. The wound and layered configuration of the present example has 0°/±45°/90°/45°/0° axial symmetry in radial cross section, and is able to reduce strain originating in the layer configuration.

Further detail shall now be provided.

The first layer section 4A has a 0 mm inside diameter and a 6 mm outside diameter, and a fiber orientation in the 0° direction relative to the length direction of the columnar body (the positioning direction of the fibers is parallel to the length direction of the columnar body).

The second layer section 4B has a 6 mm inside diameter and a 12 mm outside diameter, and a fiber orientation in the A45° direction relative to the length direction of the columnar body (the positioning direction of the fibers is i45° relative to the length direction of the columnar body).

The third layer section 4C has a 12 mm inside diameter and a 20 mm outside diameter, and a fiber orientation in the 90° direction relative to the length direction of the columnar body (the positioning direction of the fibers is 90° relative to the length direction of the columnar body).

The fourth layer section 4D has a 20 mm inside diameter and a 26 mm outside diameter, and a fiber orientation in the ±45° direction relative to the length direction of the columnar body (the positioning direction of the fibers is ±45 relative to the length direction of the columnar body).

The fifth layer section 4E has a 26 mm inside diameter and a 30 mm outside diameter, and a fiber orientation in the 0° direction relative to the length direction of the columnar body (the positioning direction of the fibers is parallel to the length direction of the columnar body).

In terms of avoiding the above-described spring back phenomenon and reducing strain originating in the layer configuration, the third layer section 4C serving as the central layer is layered and positioned as a 90°-fiber-orientation layer. Provided that the 90°-fiber-orientation layer has axial symmetry in the radial direction, the third layer section 4C serving as the central layer need not be layered and positioned similarly to the present example.

For example, a wound and layered structure having axial symmetry in the 0°/90°/t45°/90°/0° radial directions in radial cross-section may be used, the structure being obtained by: having the first fiber bodies 3A (0°-direction elements) be wound onto the first layer section 4A up to, for example, a 12 mm outside diameter; having the fourth fiber bodies 3D (90°-direction elements) be wound onto the second layer section 4B up to, for example, an 18 mm outside diameter; having the overlaid second fiber bodies 3B (+45°-direction elements) and the third fiber bodies 3C (−45°-direction elements) be wound onto the third layer section 4C up to, for example, a 22 mm outside diameter; having the fourth fiber bundles 3D (90°-direction elements) be wound onto the fourth layer section 4D up to, for example, a 28 mm outside diameter; and having the first fiber bodies 3A (0°-direction elements) be wound onto the fifth layer section 4E up to, for example, a 30 mm outside diameter.

The thickness of each layer may be determined through optimization via simulation by computer-aided engineering (CAE), etc., or by repeated trials in relation to the desired flexural and torsional characteristics. Adopting this winding and layering configuration having axial symmetry in radial directions enables internal strain produced by the layering configuration after curing to be suppressed.

Internal strain produced by the layering configuration after curing may also be suppressed by winding and layering one layer clockwise and winding and layering the subsequent layer counter-clockwise. During testing, the present inventors found that warping and torsion occurred in the cylindrical body, after molding, when all winding and layering was performed in a clockwise direction. The inventors were able to minimize the incidence of warping and torsion in the cylindrical body by having the winding and layering alternate between clockwise and counter-clockwise directions for each successive layer.

Next, a white section 11 is present at the center of the layered structure body y' of the cylindrical body obtained through these steps, the white section 11 being formed by the white color applied to the left- and right-end edge sections of the first fiber bodies 3A' as described above.

Figure 24:
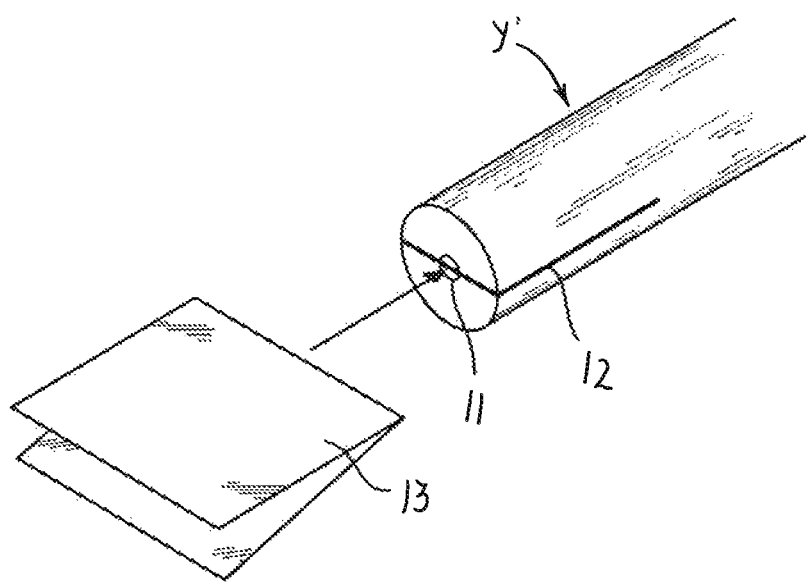
FIG. 24 is an explanatory diagram of the manufacturing process of example 2.
Figure 25:
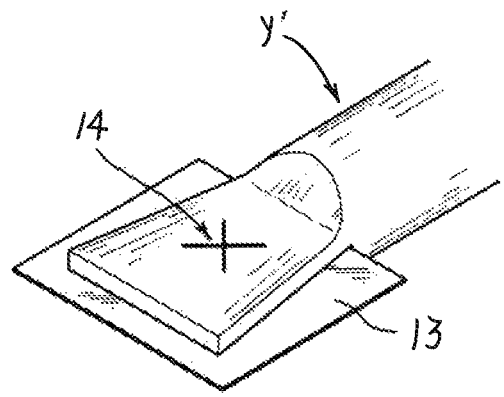
FIG. 25 is an explanatory diagram of the manufacturing process of example 2.

With the white section 11 serving as a marker, a cut 12 having a 50 mm length is made with a cutter along the 3:00-9:00 line in one end section of the layered structure body y', a release film 13 that has been folded in two is inserted into the cut 12, the end-section sides of the bundles of fiber in which the cut 12 is made in a portion above the release film 13 are spread in a fan shape up to 45 mm, and similarly, the bundles of fiber below the release film 13 are spread in a fan shape up to 45 mm (FIG. 24, 25).

It should be noted that in the step of spreading the fibers into the fan shape, the spreading is performed using the fluidity and the adhesive strength of the pre-preg. However, the first fiber bodies 3A' (0°-direction elements), which are the outermost layer, spread most easily. In instances where the pre-preg has insufficient fluidity, the fibers are made to spread more easily by heating the portion in which the cut 12 is made with a hair dryer, etc.

The above-described widening of the cut carbon fiber bundles 5 into a fan shape is similarly performed at the other end section of the layered structure body y'. When making the cut in the other end section, the cutting and widening are performed in-phase so as to be at the same linear location as the location on the 3:00-9:00 line as the one end section in which the cutting and widening have already been performed.

In testing, the present inventors found that in the present example, where the layered structure body y' of the cylindrical body has a 30 mm diameter, a value of approximately 45 mm, which is 1.5 times as great as 30 mm, is preferable for the bundles of fiber that are widened into the fan shape. When the bundles of fiber having a 50 mm length and a 30 mm diameter are widened to 45 mm, the angle of widening into the fan shape (i.e., the angle of the root of the fan shape) is 8.5 degrees (i.e., arctan (7.5/50)). Widening the fibers into a fan shape with a thickness approximately equal to the 45 mm width was accomplished by having the angle at which the bundles of fiber are widened into the fan shape be no more than roughly 10°. For example, when widening the layered structure body y' of the cylindrical body having a 30 mm diameter to 60 mm, which is twice the width, obtaining a fan shape having an equal thickness is difficult. When the layered structure body y' of the cylindrical body having a 30 mm diameter is widened into a fan shape of 60 mm, which is twice the width, the angle (arctan (15/50)) will be 16.7°. The width of widening into the fan shape is preferably roughly 1.5 times the diameter of the layered structure body y' of the cylindrical body, the angle being no more than 10°. Taking the width of widening into the fan shape and the angle (the angle of the root of the fan) into consideration when determining the length of the cut is desirable.

Next, as depicted in FIG. 25, 25-30 mm cross-shaped slits 14 are formed in the +45° and −45° directions, relative to the length direction, at locations 25 mm from both end sections of the fan-shaped portions obtained as described above, the slits 14 being provided at both respective end sections on the left and right. The slits 14 may be made through all layers, passing through the release film 13, and may also be formed by inserting a dummy plate like an underlay between the layers of the release film 13 that is folded in two, making the cross-shaped slits 14 in the fiber bodies above the release film 13, then inverting the entire article and forming the cross-shaped slits 14 in the fiber bodies below the release film 13.

Figure 26:
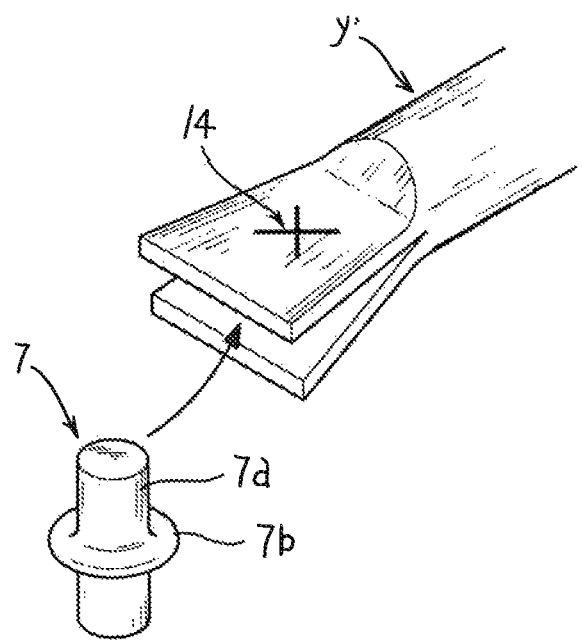
FIG. 26 is an explanatory diagram of the manufacturing process of example 2.
Figure 27:
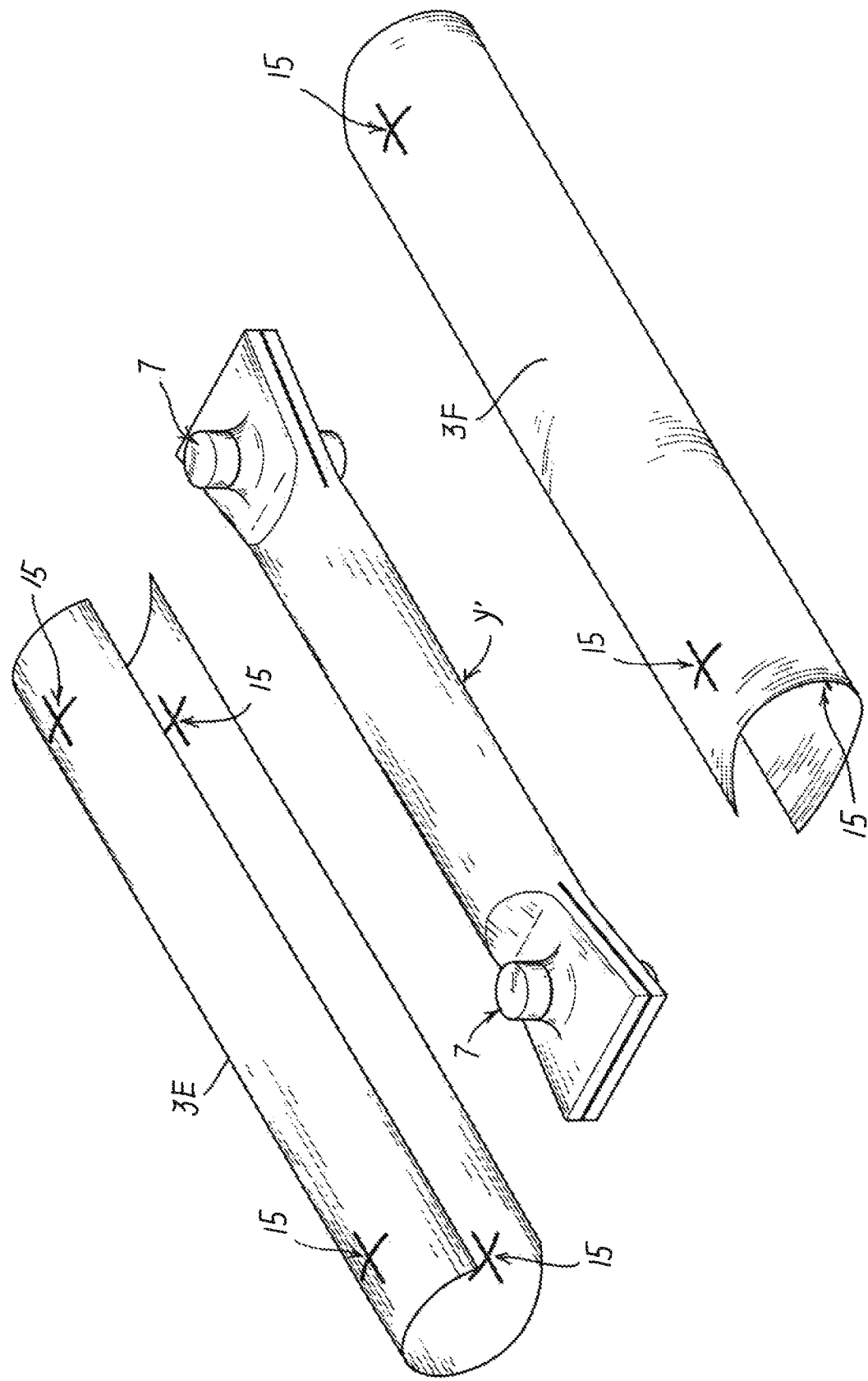
FIG. 27 is an explanatory diagram of the manufacturing process of example 2.

Next, as depicted in FIGS. 26 and 27, the release film 13 is removed, the flange-form sections 7b of the metal bodies 7 are positioned so as to be located at the location of the release film 13, the main bodies 7a above the flange-form sections 7b pass through the cross-shaped slits 14 in the fiber bodies above the release film 13, and similarly, the main bodies 7a below the flange-form sections 7b pass through the cross-shaped slits 14 in the fiber bodies below the release film 13.

Portions of the fiber bodies in which the cross-shaped slits 14 are not formed are pressed against the upper and lower surfaces (horizontal surfaces) of the flange-form sections 7b of the metal bodies 7 passed through the cross-shaped slit 14 portions in the fan-shaped fiber bodies, and the slit 14 portions of the fiber bodies are pressed against and overlaid additionally onto the circumferential surfaces (vertical surfaces) of the main bodies 7a. The connection of the fibers of the fiber bodies from the horizontal surface to the vertical surface is overlaid (overlaid) onto the metal bodies 7, enabling the adhesive force between the metal bodies 7 and the layered structure section 1 (CFRP) to be solidified.

In the present example, in addition to the first fiber bodies 3A, the second fiber bodies 3B, the third fiber bodies 3C, and the fourth fiber bodies 3D described above, fifth fiber bodies 3E and sixth fiber bodies 3F serving as cover elements covering the layered structure body Y' are provided.

Specifically, a square CF pre-preg is cut into rectangles having a 100 mm width and a 200 mm length, forming two types of fiber bodies 3 (the fifth fiber bodies 3E and the sixth fiber bodies 3E).

As depicted in FIG. 27, the fifth fiber bodies 3E are configured such that the longitudinal direction of the carbon fiber bundles 5 is set to 0°, parallel to the longitudinal direction of the layered structure section 1 (pieces in which the CF pre-preg is cut such that the longitudinal direction of the carbon fiber bundles 5 is parallel to the longitudinal direction of the layered structure section 1: 0°-direction elements).

As depicted in FIG. 27, the sixth fiber bodies 3F are configured such that the longitudinal direction of the carbon fiber bundles 5 is set to 90°, intersecting the longitudinal direction of the layered structure section (pieces in which the CF pre-preg is cut such that the longitudinal direction of the carbon fiber bundles 5 is perpendicular to the longitudinal direction of the layered structure section 1. 90°-direction elements).

Slits 15 are provided in each of the fifth fiber bodies 3E and the sixth fiber bodies 3F for the metal bodies 7 to pass through (at central sections having a 200 mm separation, located at 25 mm from both end sections).

Specifically, as depicted in FIG. 27, 20-25 mm cross-shaped slits are formed in the fifth fiber bodies 3E and the sixth fiber bodies 3F in the 0° and 90° directions, the slits being formed at four locations (four corners) at the front, back, left, and right.

Next, as depicted in FIG. 27, the sixth fiber bodies 3F obtained as described above are layered so as to wrap over the layered structure body y from right to left. When this action is performed, the upper and lower portions of the metal bodies 7 are passed through the slits at the top, bottom, left, and right of the sixth fiber bodies 3F, and the flange-form sections 7b and main bodies 7a are pressed against.

Furthermore, the fifth fiber bodies 3E are wrapped over the entire article that has been wrapped with the sixth fiber bodies 3F from left to right. When this action is performed, the upper and lower portions of the metal bodies 7 are passed through the slits at the top, bottom, left, and right of the fifth fiber bodies 3E and the flange-form sections 7b and main bodies 7a are pressed against.

Figure 28:
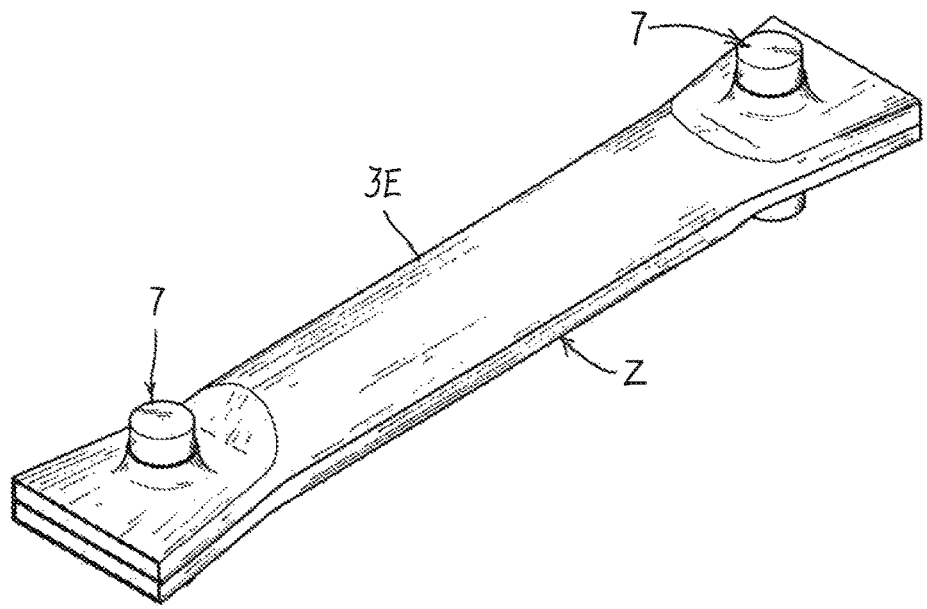
FIG. 28 is an explanatory diagram of the manufacturing process of example 2.

A layered structure Z constructed in the form of a box in which the outermost layer is provided in the form of a pouch binding from both the left and right by the fifth fiber bodies 3E (0°-direction elements) and the sixth fiber bodies 3F (90°-direction elements) (see FIG. 28). The fifth fiber bodies 3E and the sixth fiber bodies 3F may also form a structure in which the fifth fiber bodies 3E are wrapped over first, whereupon the sixth fiber bodies 3F are wrapped thereover.

When torsional rigidity is required in the link rod X manufactured in the present example, the following cover elements may also be provided.

Specifically, a square CF pre-preg is cut: into rectangles having a 100 mm width and a 200 mm length, forming two types of fiber bodies 3 (seventh fiber bodies and eighth fiber bodies; not shown).

The seventh fiber bodies are configured such that the longitudinal direction of the carbon fiber bundles 5 is set to +45°, intersecting the longitudinal direction of the layered structure section 1 (pieces in which the CF pre-preg is cut such that the longitudinal direction of the carbon fiber bundles 5 rises rightward at 45° relative to the longitudinal direction of the layered structure section 1: +45°-direction elements).

The eighth fiber bodies are configured such that the longitudinal direction of the carbon fiber bundles 5 is set to −45°, intersecting the longitudinal direction of the layered structure section 1 (pieces in which the CF pre-preg is cut such that the longitudinal direction of the carbon fiber bundles 5 drops rightward at 45° relative to the longitudinal direction of the layered structure section 1: −45°-direction elements).

Slits are provided in each of the seventh fiber bodies and the eighth fiber bodies for the metal bodies 7 to pass through (at central sections having a 200 mm separation, located at 45 mm from both end sections).

Specifically, 25-30 mm cross-shaped slits are formed in the seventh fiber bodies and the eighth fiber bodies in the +45° and −45° directions, the slits being formed at four locations (four corners) at the front, back, left, and right.

Next, the eighth fiber bodies obtained as described above are layered so as to wrap over the layered structure body y' from left to right. When this action is performed, the upper and lower portions of the metal bodies 7 are passed through the slits at the top, bottom, left, and right of the eighth fiber bodies, and the flange-form sections 7b and main bodies 7a are pressed against.

Furthermore, the seventh fiber bodies are wrapped over the entire article that has been wrapped with the eighth fiber bodies so as to wrap therearound from right to left. When this action is performed, the upper and lower portions of the metal bodies 7 are passed through the slits at the top, bottom, left, and right of the seventh fiber bodies and the flange-form sections 7b and main bodies 7a are pressed against.

This yields a box structure in which the outermost layer is provided in the form of a pouch binding from both the left and right by the seventh fiber bodies (+45°-direction elements) and the eighth fiber bodies (−45°-direction elements). The seventh fiber bodies and the eighth fiber bodies may also form a structure in which the seventh fiber bodies are wrapped over first, whereupon the eighth fiber bodies are wrapped thereover, and furthermore, the fifth fiber bodies 3E, the sixth fiber bodies 3F, the seventh fiber bodies, and the eighth fiber bodies may all be layered so as to be wrapped in alternation around the entirety of the layered structure body y from the left and the right.

Next, the layered structure Z is attached by thread 8 passing through in the layering direction of the fiber bodies 3.

Figure 29:
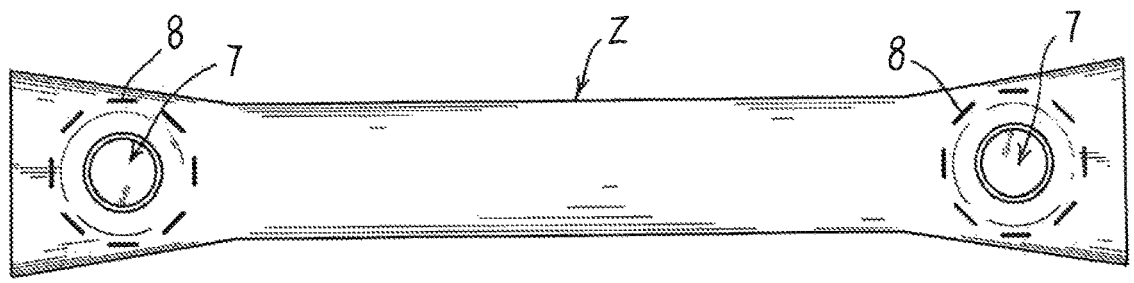
FIG. 29 is an explanatory diagram of the manufacturing process of example 2.

Specifically, one thread (or two threads) of Torayca T800HB 6K (223 tex) thread are passed through a Senkichi tatami stitching needle (sold by Fujiwara Industrial Co., Ltd.) No. 11 and, as seen in the planar direction as depicted in FIG. 29, the thread 8 is sewn in the pass-through direction, without being cut, at eight sites in the horizontal direction, the vertical direction, the +45° direction, and the −45° direction around the metal bodies 7 at the left and right, such that the seams go around the top and bottom surfaces in the circumferential direction. Supplemental thread is left at the starting point of the stitching and, after sewing around the metal bodies 7, the thread at the starting point and the thread at the ending point are tied together.

Aside from the Torayca T800HB 6K (223 tex) thread, the thread (carbon fiber) passed through the stitching needle may, for example, be MR70 12P (415 tex) thread, manufactured by Mitsubishi Chemical Corporation, which is stronger than the Torayca T800 HB thread. In terms of elasticity, polyacrylonitrile (PAN) thread (1.7%-1.9% elasticity), rather than pitch thread (0.4-0.8% elasticity) is preferably used as the carbon fiber passing through the stitching needle.

Often, in many cases, the weaving densities of the warp threads and the weft threads in a carbon fiber cloth are substantially the same (for example, a weaving density of 12.5 warp threads per 25 mm and 12.5 weft threads per 25 mm, using Torayca T300 3K (198 tex) carbon fibers manufactured by Toray Industries, Inc., having a basis weight of 198 g/m2). Layering such a cloth into the above-described layered structure Z would result in an excessive density of seams in the layered structure Z, leading to difficulties in passing the stitching needle therethrough. In the case of the fiber bodies 3 (CF pre-preg) of the present example, the weft threads are sparsely distributed and the stitching needle is easily able to pass therethrough, thereby enabling stitching with the stitching needle in the pass-through direction.

Figure 30:
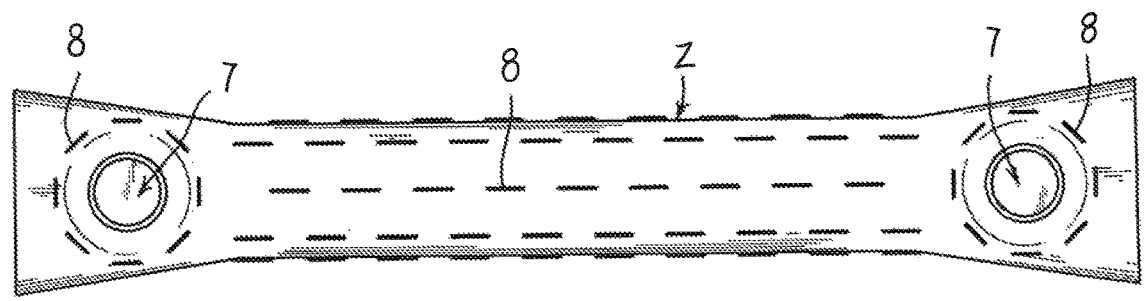
FIG. 30 is an explanatory diagram of the manufacturing process of example 2.
Figure 31:
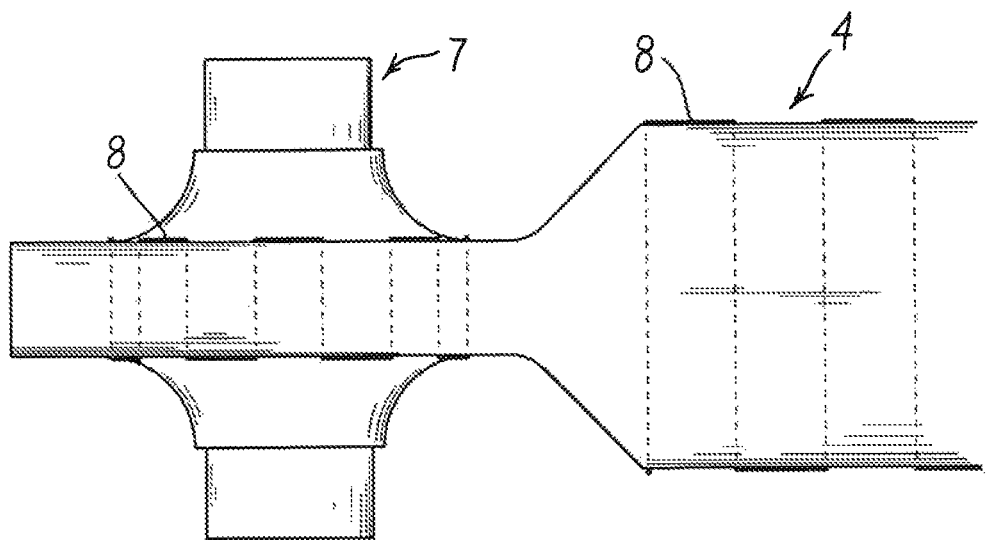
FIG. 31 is an explanatory diagram of the manufacturing process of example 2.

In a portion of the layered structure Z having a circular cross-section (portion between the metal bodies 7 having a 30 mm diameter and a 150 mm length), once stitching around the left and right metal bodies 7 is complete, one thread (or two threads) of Torayca T800HB 6K (223 tex) thread are passed through a Senkichi tatami stitching needle (sold by Fujiwara Industrial Co., Ltd.) No. 11 and, as depicted in FIGS. 30 and 31, stitching is performed in the pass-through direction at 1 cm intervals in the 12:00-6:00 direction along the length direction of the layered structure Z. When this action is performed, 100-200 mm of supplemental thread 8 is left to later tie with the thread that has been sewn in the pass-through direction.

As seen in the planar direction, 1 cm of the thread 8 is at the front surface layer and 1 cm of the thread 8 is at the rear surface layer, such that the front surface layer thread at 12:00 is visible at 1 cm intervals. This arrangement is replicated over the entire 150 mm width.

Specifically, after sewing the 12:00-6:00 portion for a 150 mm length from one end side to the other end side of the layered structure Z (portion having a round cross-section), the thread 8 that has been stitched in the 6:00 to 12:00 direction exits at the other end side. Stitching continues in the pass-through direction at 1 cm intervals in the 3:00 to 9:00 direction, without cutting the thread 8. As seen from above, 1 cm of the thread 8 is on the layer on the 3:00 side, and 1 cm of the thread 8 is on the layer on the 9:00 side. As such, for each of the layers, the thread passed therethrough is visible at 1 cm intervals. This arrangement is replicated over the entire 150 mm length of the portion having a round cross-section.

Figure 32:
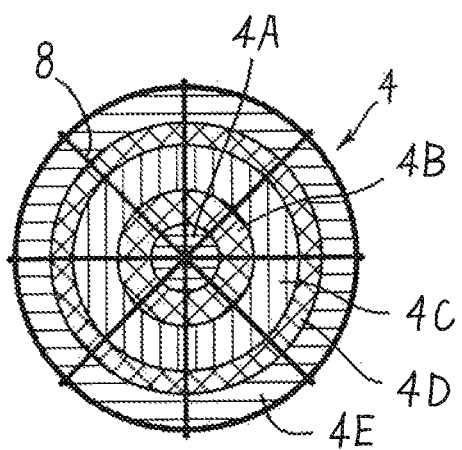
FIG. 32 is an explanatory diagram of the manufacturing process of example 2.

Also, after sewing the 3:00-9:00 portion for a 150 mm length from the other end side toward the one end side of the layered structure Z (portion having a round cross-section), the thread 8 that has been stitched in the 9:00 to 3:00 direction exits at the one end side. As in FIG. 32, stitching continues in the pass-through direction at 1 cm intervals from the 4:30 position to the 10:30 portion in terms of the hour hand of a clock, without cutting the thread 8. As seen from above, 1 cm of the thread is on the layer on the hour-hand 10:30 side, and 1 cm of the thread is on the layer on the hour-hand 4:30 side. As such, for each of the layers, the thread passed therethrough is visible at 1 cm intervals. This arrangement is replicated over the entire 150 mm length of the portion having a round cross-section.

Also, after stitching across the hour-hand 10:30-4:30 portion for a 150 mm length from the one end side toward the other end side of the layered structure Z (portion having a round cross-section), the thread 8 that has been stitched in the 10:30-4:30 direction exits at the other end side. As in FIG. 32, stitching continues in the pass-through direction at 1 cm intervals from the 1:30 position to the 7:30 portion in terms of the hour hand of a clock, without cutting the thread 8. As seen from above, 1 cm of the thread 8 is on the layer on the 1:00 side, and 1 cm of the thread 8 is on the layer on the 7:00 side. As such, for each of the layers, the thread passing through is visible at 1 cm intervals. This arrangement is replicated over the entire 150 mm length of the portion having a round cross-section.

Also, after stitching across the hour-hand 1:30-7:30 portion for a 150 mm length from the other end side to the one end side of the layered structure Z (portion having a round cross-section), the thread 8 that has been stitched in the 7:30-1:30 direction exits at the one end side. As in FIG. 32, this thread 8 is tied by a round knot, without being cut, with the supplemental 100-200 mm of the thread 8 left in advance when stitching in the 12:00-6:00 direction, and any surplus portion of the thread 8 that has been stitched in the 12:00-6:00 direction and of the thread 8 that has been stitched in the 7:30-1:30 direction is cut.

The layered structure Z that has been subjected to the above-described stitching step serves as the layered body 4.

In the present example, a wave stitch is presented by way of exemplification. However, a half backstitch or a full backstitch may also be used. Using a half backstitch or a full backstitch yields a higher thread density in the pass-through direction than when a wave stitch is used, and as such, although such approaches enable inter-layer peeling to be suppressed in the layered body 4, the fibers become bound similarly to NCF. As such, the pitch of a first and second half backstitch or full backstitch is preferably set, as appropriate, in accordance with the viscosity of the resin with which the pre-preg is coated and with the number of layers.

In the present example, the stitching step is performed manually. However, provided that a similar stitching format is obtained, a mechanism such as a sewing machine having upper thread and lower thread may also be used.

Next, the layered body 4 is coated with an epoxy resin and set in a predefined mold. Curing of the epoxy resin progresses through the application of pressure and heat via autoclave molding or press molding under predefined curing conditions, and a CFRP member is obtained (FIG. 33). The molding may also be performed using RTM molding or VARTM molding similarly using layering and stitching, as well, given that thickening the outside diameter in a prior stage of winding the fourth fiber bodies 3D (90°-direction elements), in which the spring-back phenomenon is prone to occurring as described above, reduces the effect of the spring-back phenomenon despite the fourth fiber bodies 3D (90°-direction elements) being wound.

The Resulting CFRP member has two rectangular end sections produced by the box structure layering step. As such, the two end sections are machined into an arcuate form and, given that the metal bodies 7 are solid, a finishing process is applied by forming through-holes having a ø8.5 mm diameter at a preset 200 mm pitch, thereby completing the link rod X (see FIG. 15).

Even if, for example, the link rod X is secured at the left-hand end and a force is applied in the vertical direction to the right-hand end, inter-layer peeling in the layered structure section 1 relative to the moment of curvature is prevented by the stitched carbon fibers.

Also, even if the link rod X is secured at the left-hand end and a force is applied in a twisting direction rotating the right-hand end, the torsional rigidity will be superior to that of a typical layered body due to the second fiber bodies 3B (+45° layers) and the third fiber bodies 3C (-45° layers) of the layered structure section 1, and due to the box structure layers formed by the fifth fiber bodies 3E and the sixth fiber bodies 3F. Furthermore, inter-layer peeling of the layered structure section 1 due to the twisting force is prevented by the stitched carbon fibers.

The present example, configured as described above, produces the following effects.

A fan shape can be maintained without deformation and without producing stray fibers, even when a single fiber body 3 is cut, for example, into a fan shape.

Also, given that the warp threads are heat set, the fibers do not become displaced even when wound and layered by a rolling machine, similarly to when a rolling machine that performs winding and layering is used to create the layered structure Z of the present example.

The other effects are similar to those of example 1.

The present invention is not limited to examples 1 and 2. The specific configuration of the constituent components may be designed as appropriate.

The invention claimed is:

1. A connection member for a vehicle structure equipped with at least two connection sections that connect appropriate sites within the vehicle structure, the connection member being characterized by having a columnar layered structure section configured by impregnating a layered body in which a plurality of fiber bodies have been winded with a matrix resin and curing the impregnated layered body, and employing, as the fiber bodies, bodies in which bundles of unidirectionally aligned carbon fibers have been interwoven with thermally fusible fibers, wherein end sections of the layered structure are provided with the connection sections, and the connection sections comprise cross-shaped slits, wherein the end sections of the layered structure are divided and comprise first parts and second parts with an axis of symmetry between the first parts and the second parts, wherein the cross-shaped slits are formed in each layer of the layered structure such that first angles of first cross-shaped slits of the first parts symmetrically correspond to second angles of second cross-shaped slits of the second parts based on the axis of symmetry, and wherein at least one of the first cross-shaped slits is formed at 45° relative to a 0° longitudinal direction of the layered structure section, and at least one of the first-cross-shaped slits is formed at -45° relative to the longitudinal direction of the layered structure section.

2. The connection member according to claim 1, characterized in that as the fiber bodies there are used: first fiber bodies, in which the longitudinal direction of the carbon fiber bundles is set to 0°, parallel to the longitudinal direction of the layered structure section; second fiber bodies, in which the longitudinal direction of the carbon fiber bundles is set to +45°, intersecting the longitudinal direction of the layered structure section; third fiber bodies, in which the longitudinal direction of the carbon fiber bundles is set to -45°, intersecting the longitudinal direction of the layered structure section; and fourth fiber bodies, in which the longitudinal direction of the carbon fiber bundles is set to 90°, intersecting the longitudinal direction of the layered structure section.

3. The connection member according to claim 2, characterized in that the layered body is attached by threads passing through in the layering direction of the fiber bodies.

4. The connection member according to claim 2, characterized in that the layered body has a rod-form shape and includes: a first layer section provided by winding the first fiber bodies; a second layer section, provided by winding the second fiber bodies and the third fiber bodies in an overlaid state about the first layer section; a third layer section, provided by winding the fourth fiber bodies about the second layer section; a fourth layer section, provided by winding the second fiber bodies and the third fiber bodies in an overlaid state about the third layer section; and a fifth layer section, provided by winding the first fiber bodies about the fourth layer section.

5. The connection member according to claim 4, characterized in that: the first fiber bodies constituting the first layer section, and the overlaid second and third fiber bodies constituting the second layer section, are set so as to be wound in opposite directions; the overlaid second and third fiber bodies constituting the second layer section, and the fourth fiber bodies constituting the third layer section, are set so as to be wound in opposite directions; the fourth fiber bodies constituting the third layer section, and the overlaid second and third fiber bodies constituting the fourth layer section, are set so as to be wound in opposite directions; and the overlaid second and third fiber bodies constituting the fourth layer section, and the first fiber bodies constituting the fifth layer section, are set so as to be wound in opposite directions.

6. The connection member according to claim 1, characterized in that the layered body is attached by threads passing through in the layering direction of the fiber bodies.

7. The connection member according to claim 1, characterized by being a link rod, a tower bar, or an under cover.

8. A connection member for a vehicle structure equipped with at least two connection sections that connect appropriate sites within the vehicle structure, the connection member being characterized by having a columnar layered structure section configured by impregnating a layered body in which a plurality of fiber bodies have been winded with a matrix resin and curing the impregnated layered body, and employing, as the fiber bodies, bodies in which bundles of unidirectionally aligned carbon fibers have been interwoven with thermally fusible fibers, and the connection sections being configured from metal bodies affixed to the layered structure section, wherein end section of the layered structure are provided with the connection sections, and the connection sections comprise cross-shaped slits, wherein the end sections of the layered structure are divided and comprise first parts and second parts with an axis of symmetry between the first parts and the second parts, wherein the cross-shaped slits are formed in each layer of the layered structure such that first angles of first cross-shaped slits of the first parts symmetrically correspond to second angles of second cross-shaped slits of the second parts based on the axis of symmetry, wherein at least one of the first cross-shaped slits is formed at 45° relative to a 0° longitudinal direction of the layered structure section, and at least one of the first-cross-shaped slits is formed at −45° relative to the longitudinal direction of the layered structure section, wherein the metal bodies are provided with a flange-form section on a circumferential surface of a main body serving as the axis of symmetry, and wherein a number of layers of the first parts on an upward side of the flange-form section is equal to a number of layers of the second parts on a downward side of the flange-form section.

9. The connection member for a vehicle structure according to claim 8, characterized by the metal bodies being provided with a flange-form section on the circumferential surface of a main body, the metal bodies passing through the layered structure section via the cross-shaped slits, and the fiber bodies being overlaid onto the surface of the flange-form section and the circumferential surface of the main body of each of the metal bodies.

10. The connection member according to claim 9, characterized in that as the fiber bodies there are used: first fiber bodies, in which the longitudinal direction of the carbon fiber bundles is set to 0°, parallel to the longitudinal direction of the layered structure section; second fiber bodies, in which the longitudinal direction of the carbon fiber bundles is set to +45°, intersecting the longitudinal direction of the layered structure section; third fiber bodies, in which the longitudinal direction of the carbon fiber bundles is set to −45°, intersecting the longitudinal direction of the layered structure section; and fourth fiber bodies, in which the longitudinal direction of the carbon fiber bundles is set to 90°, intersecting the longitudinal direction of the layered structure section.

11. The connection member according to claim 10, characterized in that the layered body is attached by threads passing through in the layering direction of the fiber bodies.

12. The connection member according to claim 10, characterized in that the layered body has a rod-form shape and includes: a first layer section provided by winding the first fiber bodies; a second layer section, provided by winding the second fiber bodies and the third fiber bodies in an overlaid state about the first layer section; a third layer section, provided by winding the fourth fiber bodies about the second layer section; a fourth layer section, provided by winding the second fiber bodies and the third fiber bodies in an overlaid state about the third layer section; and a fifth layer section, provided by winding the first fiber bodies about the fourth layer section.

13. The connection member according to claim 12, characterized in that: the first fiber bodies constituting the first layer section, and the overlaid second and third fiber bodies constituting the second layer section, are set so as to be wound in opposite directions; the overlaid second and third fiber bodies constituting the second layer section, and the fourth fiber bodies constituting the third layer section, are set so as to be wound in opposite directions; the fourth fiber bodies constituting the third layer section, and the overlaid second and third fiber bodies constituting the fourth layer section, are set so as to be wound in opposite directions; and the overlaid second and third fiber bodies constituting the fourth layer section, and the first fiber bodies constituting the fifth layer section, are set so as to be wound in opposite directions.

14. The connection member according to claim 9, characterized in that the layered body is attached by threads passing through in the layering direction of the fiber bodies.

15. The connection member according to claim 8, characterized in that as the fiber bodies there are used: first fiber bodies, in which the longitudinal direction of the carbon fiber bundles is set to 0°, parallel to the longitudinal direction of the layered structure section; second fiber bodies, in which the longitudinal direction of the carbon fiber bundles is set to +45°, intersecting the longitudinal direction of the layered structure section; third fiber bodies, in which the longitudinal direction of the carbon fiber bundles is set to −45°, intersecting the longitudinal direction of the layered structure section; and fourth fiber bodies, in which the longitudinal direction of the carbon fiber bundles is set to 90°, intersecting the longitudinal direction of the layered structure section.

16. The connection member according to claim 15, characterized in that the layered body is attached by threads passing through in the layering direction of the fiber bodies.

17. The connection member according to claim 15, characterized in that the layered body has a rod-form shape and includes: a first layer section provided by winding the first fiber bodies; a second layer section, provided by winding the second fiber bodies and the third fiber bodies in an overlaid state about the first layer section; a third layer section, provided by winding the fourth fiber bodies about the second layer section; a fourth layer section, provided by winding the second fiber bodies and the third fiber bodies in an overlaid state about the third layer section; and a fifth layer section, provided by winding the first fiber bodies about the fourth layer section.

18. The connection member according to claim 17, characterized in that: the first fiber bodies constituting the first layer section, and the overlaid second and third fiber bodies constituting the second layer section, are set so as to be wound in opposite directions; the overlaid second and third fiber bodies constituting the second layer section, and the fourth fiber bodies constituting the third layer section, are set so as to be wound in opposite directions; the fourth fiber bodies constituting the third layer section, and the overlaid second and third fiber bodies constituting the fourth layer section, are set so as to be wound in opposite directions; and the overlaid second and third fiber bodies constituting the fourth layer section, and the first fiber bodies constituting the fifth layer section, are set so as to be wound in opposite directions.

19. The connection member according to claim 8, characterized in that the layered body is attached by threads passing through in the layering direction of the fiber bodies.

* * * * *

UNITED STATES PATENT AND TRADEMARK OFFICE
CERTIFICATE OF CORRECTION

PATENT NO. : 12,179,845 B2
APPLICATION NO. : 17/911716
DATED : December 31, 2024
INVENTOR(S) : Hiroshi Tanaka et al.

It is certified that error appears in the above-identified patent and that said Letters Patent is hereby corrected as shown below:

In the Specification

Column 15, Line 44, please change ""*45" to --+45--
Column 18, Line 55, please change "225" to --25--
Column 20, Line 65, please change "present:" to --present--
Column 21, Line 13, please begin new paragraph at "As indicated in FIGS. 15 and 16, the metal bodies 7..."
Column 21, Line 16, please change "015" to --⌀15--
Column 22, Line 42, please change "250+5/-0 nm" to --250+5/-0 mm--
Column 25, Line 6, please change "A45°" to --±45°--
Column 25, Line 7, please change "i45°" to --±45°--
Column 25, Line 33, please change "0° /90° /t45° /90° /0°" to --0° /90° / ± 45°/90° /0°--

Signed and Sealed this
Sixteenth Day of September, 2025

Coke Morgan Stewart
*Acting Director of the United States Patent and Trademark Office*